(12) United States Patent
Rai et al.

(10) Patent No.: US 9,967,355 B2
(45) Date of Patent: *May 8, 2018

(54) METHODS AND APPARATUS FOR AGGREGATING AND DISTRIBUTING CONTACT AND PRESENCE INFORMATION

(71) Applicant: Sonus Networks, Inc., Westford, MA (US)

(72) Inventors: Shambhu Dayal Rai, Monmouth Junction, NJ (US); Timothy R. Thornton, Brick, NJ (US)

(73) Assignee: Sonus Networks, Inc., Westford, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/190,799

(22) Filed: Jun. 23, 2016

(65) Prior Publication Data

US 2016/0308993 A1 Oct. 20, 2016

Related U.S. Application Data

(63) Continuation of application No. 14/312,038, filed on Jun. 23, 2014, now Pat. No. 9,398,107, and a continuation-in-part of application No. 14/231,606, filed on Mar. 31, 2014.

(51) Int. Cl.
*G06F 15/16* (2006.01)
*H04L 29/08* (2006.01)
*H04L 29/06* (2006.01)

(52) U.S. Cl.
CPC .......... *H04L 67/28* (2013.01); *H04L 65/1006* (2013.01); *H04L 67/24* (2013.01)

(58) Field of Classification Search
CPC ................................. H04L 67/28; H04L 67/24
USPC ......................................... 709/203, 217, 246
See application file for complete search history.

(56) References Cited

U.S. PATENT DOCUMENTS

| 5,768,519 | A | * | 6/1998 | Swift | ................. G06F 21/6218 707/999.009 |
| 7,437,320 | B2 | * | 10/2008 | Davidson | ............... G06Q 10/06 705/7.11 |
| 7,441,032 | B2 | | 10/2008 | Costa Requena | |
| 7,536,437 | B2 | | 5/2009 | Zmolek | |
| 7,673,327 | B1 | * | 3/2010 | Polis | ................... G06F 17/3089 713/151 |

(Continued)

*Primary Examiner* — Michael Y Won
(74) *Attorney, Agent, or Firm* — Straub & Straub; Stephen T. Straub; Michael P. Straub

(57) ABSTRACT

Methods and apparatus for aggregating and distributing contact information for a user with multiple user identifiers in a plurality of domains. In one embodiment a set of user identifiers corresponding to a first user includes a first user identifier corresponding to a first domain and a second user identifier corresponding to a second domain. A request is made using the first user identifier for contacts associated in the first domain with the first user identifier and a request is made using the second user identifier, for contacts associated in the second domain with the second user identifier. An aggregated contact list corresponding to the first user is generated from a first contact list received from the first domain and from a second contact list received from the second domain. In some embodiments the aggregated contact list and associated user presence information is distributed to the first and second domains.

19 Claims, 21 Drawing Sheets

(56) References Cited

U.S. PATENT DOCUMENTS

| | | |
|---|---|---|
| 7,917,583 B2 | 3/2011 | Angiolillo |
| 7,933,608 B2 | 4/2011 | Tejani et al. |
| 8,194,642 B2* | 6/2012 | Rosenberg .......... H04L 65/1016 370/352 |
| 8,369,311 B1 | 2/2013 | Kirchhoff et al. |
| 8,412,675 B2* | 4/2013 | Alvarado ............. G06Q 10/109 707/616 |
| 8,422,487 B2 | 4/2013 | Mason et al. |
| 8,694,517 B2* | 4/2014 | Johnsen ................ G06Q 10/10 707/736 |
| 8,861,537 B1 | 10/2014 | Braithwaite et al. |
| 8,903,903 B2 | 12/2014 | Benedyk |
| 8,954,500 B2* | 2/2015 | Marlow ................. G06Q 10/10 705/319 |
| 9,100,218 B2* | 8/2015 | Green ................... G06Q 10/107 |
| 2005/0068167 A1* | 3/2005 | Boyer ................... H04L 12/581 340/531 |
| 2005/0289180 A1* | 12/2005 | Pabla ................... G06Q 10/109 |
| 2006/0146792 A1* | 7/2006 | Ramachandran ... H04L 12/6418 370/352 |
| 2006/0212420 A1* | 9/2006 | Murthy .............. G06F 17/30911 |
| 2007/0027975 A1* | 2/2007 | Tai ..................... H04L 29/1216 709/223 |
| 2007/0121865 A1* | 5/2007 | Jachner ............. H04M 3/42374 379/201.01 |
| 2007/0130260 A1 | 6/2007 | Weintraub |
| 2008/0162637 A1 | 7/2008 | Adamczyk |
| 2008/0243789 A1* | 10/2008 | Kussmaul ............... G06Q 10/00 |
| 2009/0034698 A1 | 2/2009 | Karnalkar et al. |
| 2010/0075673 A1* | 3/2010 | Colbert ................ H04L 12/589 455/435.1 |
| 2010/0208634 A1* | 8/2010 | Eng ........................ H04L 45/00 370/310 |
| 2010/0238919 A1* | 9/2010 | Froelich ................ H04L 12/581 370/352 |
| 2010/0299385 A1 | 11/2010 | Root |
| 2010/0299615 A1 | 11/2010 | Miluzzo |
| 2011/0035443 A1 | 2/2011 | Jensen |
| 2011/0044321 A1 | 2/2011 | Rosenberg et al. |
| 2011/0113094 A1 | 5/2011 | Chunilal |
| 2011/0202602 A1 | 8/2011 | Biollo |
| 2012/0150974 A1* | 6/2012 | Jana ............. H04L 69/08 709/206 |
| 2013/0022030 A1* | 1/2013 | Hillier ............. H04M 1/274508 370/338 |
| 2013/0166595 A1* | 6/2013 | Meketa ............. H04L 63/0815 707/783 |
| 2013/0212176 A1 | 8/2013 | Koulomzin |
| 2013/0238723 A1 | 9/2013 | Balannik |
| 2014/0095602 A1 | 4/2014 | Sheppard |
| 2014/0149511 A1 | 5/2014 | Nunez Diaz |
| 2014/0164519 A1 | 6/2014 | Shah |
| 2014/0229614 A1 | 8/2014 | Aggarwal et al. |
| 2015/0237008 A1* | 8/2015 | Ansari ................... H04L 63/02 726/1 |

* cited by examiner

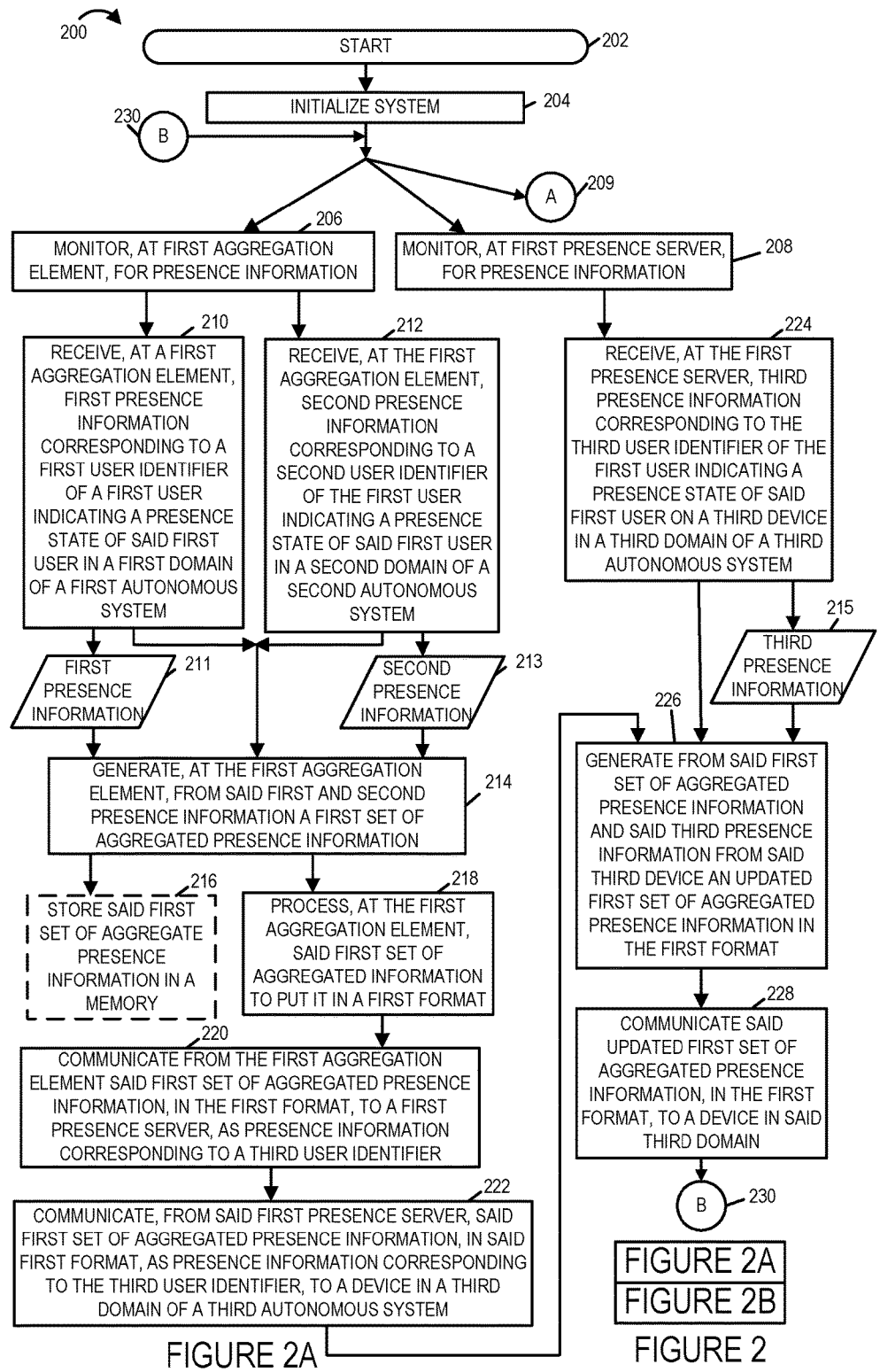

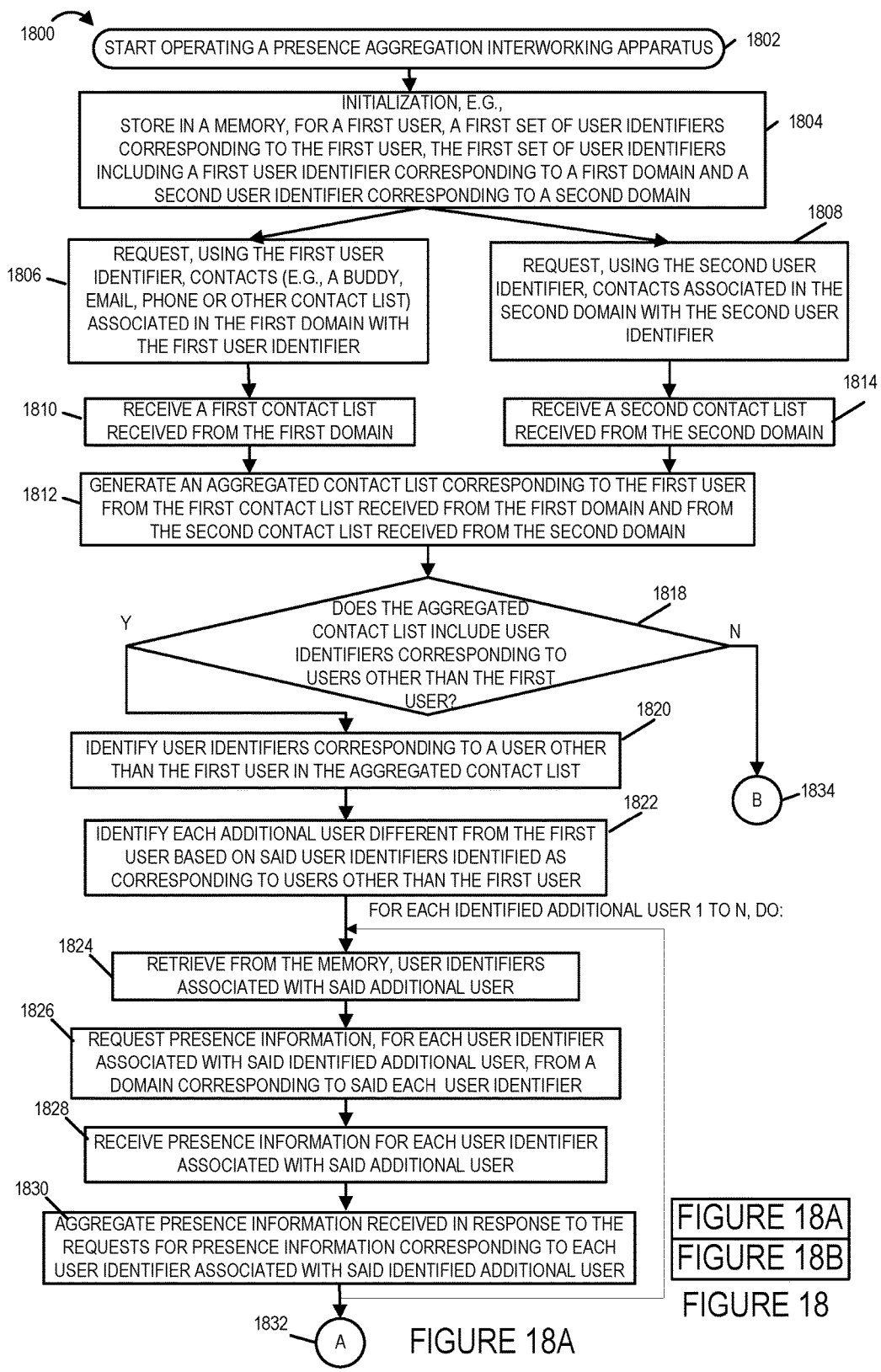

METHODS AND APPARATUS FOR AGGREGATING AND DISTRIBUTING CONTACT AND PRESENCE INFORMATION

RELATED APPLICATIONS

The present application is a continuation of U.S. patent application Ser. No. 14/312,038 filed on Jun. 23, 2014, entitled, Methods And Apparatus For Aggregating And Distributing Contact And Presence Information which is a continuation in part of U.S. patent application Ser. No. 14/231,606 filed Mar. 31, 2014, entitled, Methods and Apparatus for Aggregating and Distributing Presence Information, both of which are hereby expressly incorporated by reference in their entirety and which are owned by the assignee of the instant application.

FIELD

The present application relates to methods and apparatus for aggregating and distributing user presence information across multiple autonomous systems and/or domains. In some instances the user presence information is user presence information for users contained on a contact list. The present application also relates to methods and apparatus for aggregating and distributing contact lists containing user presence information across multiple autonomous systems and/or domains.

BACKGROUND

Session Initiation Protocol (SIP) is an application level protocol defined by Internet Engineering Task Force (IETF) for creating, modifying and terminating multimedia sessions. SIP is widely used for establishing and terminating voice, video, and messaging sessions over IP (Internet Protocol) and to exchange presence information.

Presence information is a status indicator that conveys ability and willingness of a potential communication partner (on the other end). A user's client provides presence information (presence state) to a presence service. The presence service stores the user's presence information in what constitutes the user's personal availability record sometimes referred to as a presentity. Under certain conditions the user's presentity is made available for distribution to other users, who are sometimes referred to as watchers, to convey the user's availability for communication. In this way the presence information is the service enabler for instance messaging (IM), voice or video sessions. The growth in popularity of instant messaging and voice over IP from consumers is largely attributed to the availability of the presence information of other users such as in a buddy list.

There are currently multiple services offering presence, IM, and/or voice/video communications services. For example, the IP (Internet Protocol) Multimedia Subsystem (IMS) is an architectural framework for delivering Internet Protocol (IP) multimedia services. IMS was originally designed by the wireless standards body 3rd Generation Partnership Project (3GPP) and later on maintained and updated by 3GPP, 3GPP2 and TISPAN (Telecommunications and Internet converged Services and Protocols for Advanced Networking) as a collaborative effort. IMS defines an architecture and procedures for implementing the voice, video, IM and presence services based on Session Initiation Protocol. IMS is considered one of the next generation architectures for providing services over IP among the Telcom industry. There are also numerous web based services such as, for example, Google Talk (gtalk), skype, and yahoo instant messaging offering presence enabled instant messaging, voice and/or video services. Moreover, there are product offerings such as, for example, Microsoft Lync and Cisco Jabber, which are popular in the Enterprise market. Microsoft (MS) Lync offers integrated instant messaging, voice, video services from a system hosted in the Enterprise as well as Lync online which is a cloud based communication service. In such systems in order to get a communication service a user needs an Identity which is recognized in the service domain. For example, a skype ID is needed for using skype service, an IMS Public user Identity is needed for using IMS service, and an Microsoft Lync ID is needed for using Lync service.

These communication services are managed as Autonomous systems which recognize the user by the Identity assigned to the user by the system. However, each system does not know the Identities of the same user in other Autonomous systems. As a result, presence aggregation logic does not take the activity on other user identities of the same user into consideration. This leads to inaccurate representation of the presence state of the user. For example, Microsoft Lync aggregates the presence of the user based on the activity of the user on all the devices, the user logged in with a Microsoft Lync ID. But, Microsoft Lync presence does not take into account the user activity in other domains or autonomous systems such as gtalk or IMS phone. Moreover, the known technology also suffers from the inability of contact information contained for a user in various Autonomous systems and/or disparate domains to be synchronized across the various Autonomous systems and/or disparate domains.

It should be appreciated that there is a need for methods and apparatus that can aggregate and distribute a user's presence information across multiple autonomous federated and non-federated systems and/or domains.

It should be further appreciated that there is a need for methods and apparatus that can request a user's contacts for multiple autonomous systems and/or disparate domains, generate an aggregated contact list corresponding to the user, and distributing the aggregated contact list to one or more devices of the user therein allowing for the synchronization of a user's contact list over multiple autonomous systems and/or disparate domains.

SUMMARY

Various embodiments, in accordance with the present invention, are directed to methods and apparatus for combining presence state information for a user, who has different identities corresponding to different domains and/or autonomous systems, and/or for redistributing combined presence state information across multiple autonomous federated and non-federated systems and/or domains.

For example, MS Lync presence state corresponding to a user is updated based on the user's activity on the IMS identity, e.g., phone number, of the user.

A user has a plurality of user identities, e.g., a Google ID, an IMS ID, a PBX phone number, a Lync ID, etc., corresponding to different domains and/or different autonomous systems. A PAIF (Presence Aggregation Interworking Function) device aggregates presence state information corresponding to the same user and different non-Lync IDs, formats the aggregated information into a Lync compatible format, and communicates the aggregated formatted presence state information to a Lync Presence server. The Lync Presence server may, and sometimes does, further aggregation of the aggregated presence state information received from the PAIF, corresponding to the user, with presence state information from one or more devices using a Lync ID, corresponding to the same user. The Lync presence server distributes the aggregated presence state information to other devices, which have expressed an interest in receiving presence state information corresponding to the user.

An exemplary method of providing presence information in a communications environment including multiple autonomous systems, in accordance with some embodiments includes: receiving, at a first aggregation element, first presence information corresponding to a first user identifier of a first user indicating a presence state of said first user in a first domain of a first autonomous system; receiving, at the first aggregation element, second presence information corresponding to a second user identifier of the first user indicating a presence state of said first user in a second domain of a second autonomous system; generating, at the first aggregation element, from said first and second presence information a first set of aggregated presence information; and communicating from the first aggregation element said first set of aggregated presence information, in a first format, to a first presence server, as presence information corresponding to a third user identifier.

An exemplary method of operating a presence aggregation interworking apparatus, in accordance with some embodiments includes: storing in memory for a first user a first set of user identifiers corresponding to said first user (e.g. aliases corresponding to the first user), said first set of user identifiers including a first user identifier corresponding to a first domain and a second user identifier corresponding to a second domain; requesting, using the first user identifier, contacts, (e.g., a buddy, Email, phone or other contact list) associated in the first domain with the first user identifier; requesting, using the second user identifier, contacts (e.g., a buddy, Email, phone or other contact list) associated in the second domain with the second user identifier; and generating an aggregated contact list corresponding to said first user from a first contact list received from said first domain and from a second contact list received from said second domain.

While various exemplary embodiments and features have been described, numerous additional features and embodiments are described in the detailed description which follows.

BRIEF DESCRIPTION OF THE FIGURES

FIG. 2 comprises the combination of FIG. 2A and FIG. 2B.

FIG. 2A is a first part of a flowchart of an exemplary method of providing presence information in a communications environment including multiple autonomous systems in accordance with an exemplary embodiment.

FIG. 18 comprises the combination of FIG. 18A and FIG. 18B.

FIG. 18A is a first part of a flowchart of an exemplary method of providing aggregated contact information in a communications environment in accordance with an exemplary embodiment.

DETAILED DESCRIPTION

Figure 1:
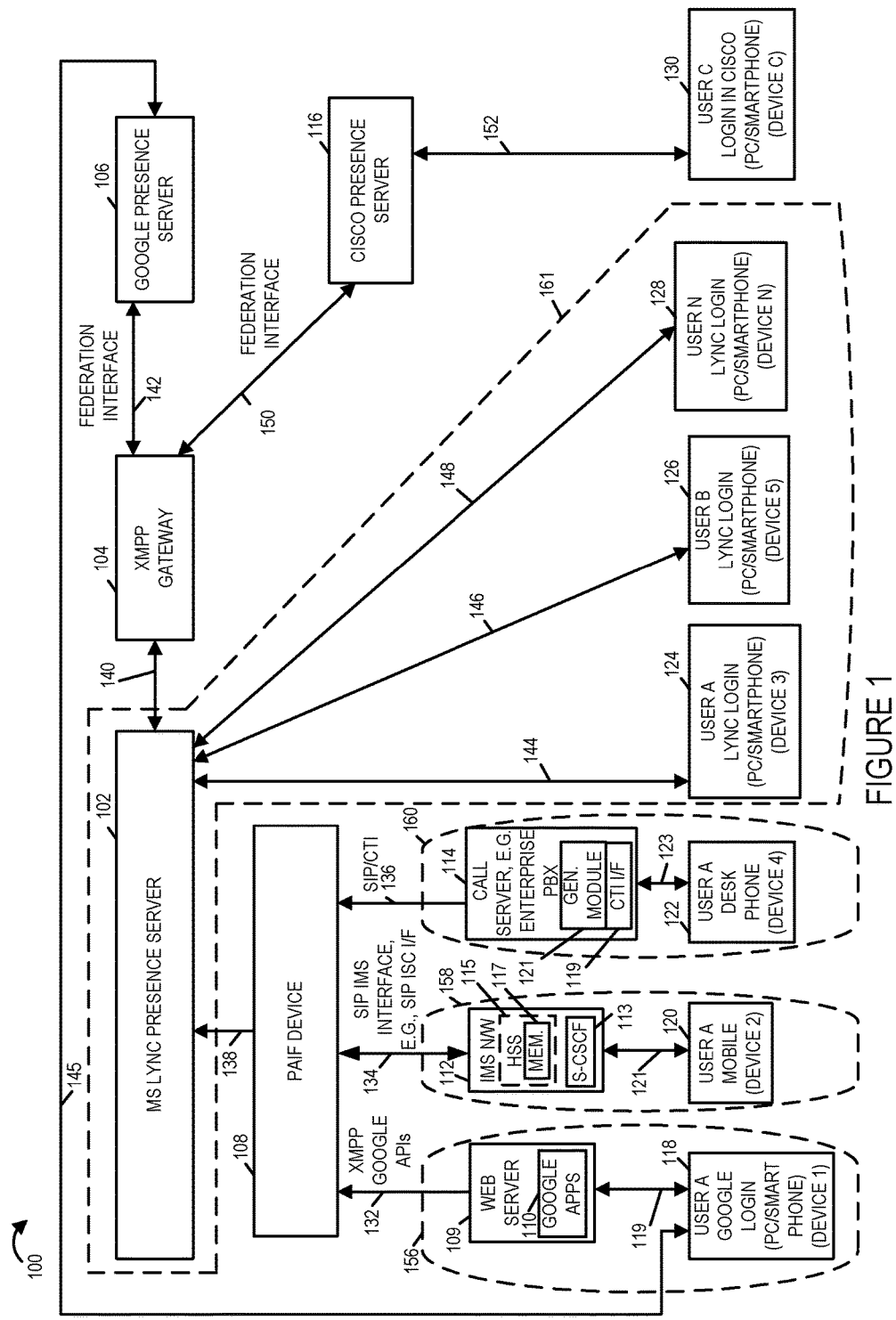
FIG. 1 illustrates an exemplary communications environment in accordance with one embodiment of the present invention.

FIG. 1 illustrates an exemplary communications environment 100 including, among other things, a presence server 102 and a presence aggregation information interworking function device (PAIF device) 108 for processing data, in accordance with one embodiment of the present invention. The data being processed may be, and in various embodiments is, user presence information from a variety of different systems. In some embodiments of the present invention, the exemplary communications environment 100 is implemented to aggregate user presence information for one or more user's from a plurality of autonomous communications systems and then distribute the aggregated presence information to one or more devices.

The exemplary communications environment 100 includes a presence server 102 which is shown in the exemplary embodiment as a MS Lync Presence server, an Extensible Messaging and Presence Protocol (XMPP) gateway 104, a Google presence server 106, a Cisco presence server 116, a presence aggregation information interworking function device (PAIF device) 108, a web server 109 including a Google applications module 110, an IP Multimedia Subsystem (IMS) network 112, and a call server 114, e.g., an Enterprise PBX system.

IMS network 112 includes a call server control entity, e.g., S-CSCF (Serving-Call Session Control Function) 113. In the exemplary embodiment, device 2 120 is a mobile device having an IMS ID corresponding to user A. In some embodiments, second presence information, corresponding to device 2 120 and user A, which is communicated to PAIF device 108, includes SIP session information from S-CSCF 113. In some embodiments, IMS network 112 includes a home subscriber server (HSS) 115 including memory 117 for storing one or more sets of aggregate presence information corresponding to IMS IDs, e.g., for storing a first set of aggregate presence information corresponding to the IMS ID being used by device 2 120. Thus, in some embodiments, aggregate presence information generated by PAIF device 108 is stored in the IMS network 112 in memory 117 of HSS 115.

Call server 114 includes a CTI interface 119 and a generation module 121. The CTI interface 119 is configured to monitor for call activity corresponding to a fourth user identifier corresponding to user A, e.g., activity corresponding to user identifier used with desk phone device 4 122. Generation module 121 is configured to generate fourth presence information based on the monitoring of the CTI interface 119. Fourth presence information is an input to PAIF device 108.

The exemplary communications environment 100 further includes a plurality of user devices (device 1 118, device 2 120, device 3 124, device 4 122, device 5 126, . . . , device N 128, and device C 130). Device 1 118 is a PC/smartphone, which corresponds to user A and which includes Google login capability. Device 2 120 is a mobile, e.g. a cell phone with an IMS ID, which corresponds to user A. Device 3 124 is a PC/smartphone, which corresponds to user A and which includes Lync login capability. Device 4 122 is a desk phone, which corresponds to user A and which interfaces to Enterprise PBX 114. Device 5 126 is a PC/smartphone, which corresponds to user B and which includes Lync login capability and a MS Lync ID different from user A and user N. Device N 128 is a PC/smartphone, which corresponds to user N and which includes Lync login capability and a MS Lync ID different from user A and B. Device C 130 is a PC/smartphone, which corresponds to user C and which includes Cisco login capability.

The exemplary communications environment 100 further includes communications links (119, 121, 144, 123, 146, 148, 152) between user devices (user device 1 118, user device 2 120, user device 4 122, user device 3 124, user device B 126, user device N 128, user device C 130) and (Google applications module 110, IMS network 112, Enterprise PBX system 114, MS Lync Presence server 102, MS Lync Presence server 102, MS Lync Presence server 102, Cisco Presence server 116), respectively. The exemplary communications environment 100 further includes a link 132 between web server 109 including Google Applications module 110 and PAIF device 108, a link 134 between IMS network 112 and PAIF device 108, a link 136 between Enterprise PBX system 114 and PAIF device 108, a link 138 between PAIF device 108 and MS Lync presence server 102. Exemplary system 100 further includes a communications link 140 between MS Lync Presence server 102 and XMPP gateway 104, a communications link 142, e.g., a Federation interface, between XMPP gateway 104 and Google presence server 106, a communications link 150, e.g., a Federation interface, between XMPP gateway 104 and Cisco Presence server 116, and a communications link 145 between Google Presence server 106 and user device 1 106. The communications links of the communications environment 100 may be, and in some embodiments are, bi-directional communications links.

Google Apps 110 and user device 1 118 are part of a first autonomous network 156. IMS network 112 and user device 2 120 are part of a second autonomous network 158. Call server 114, e.g., an Enterprise PBX system, and user device 4 122 are part of a fourth autonomous system 160. User device 3 124, user device 5 126, and user device N 128, and MS Lync presence server 102 are part of a third autonomous network 161.

PAIF device 108 receives and aggregates presence information corresponding to different user identifiers for the same user, e.g., user A, corresponding to different domains in different autonomous systems. The PAIF device 108 receives presence information to be aggregated via different interfaces, e.g., a XMPP interface via link 132, a SIP IMS interface via link 134, and a SIP/CTI interface via link 136. The PAIF device 108 generates a set of aggregated presence information from the received presence information and puts it in a first format, e.g., a format compatible to the MS Lync presence server 102. The MS Lync presence server 102 receives presence information from devices with a MS Lync interface, e.g., PAIF device 138, device 3 124, device 126, and device N 128. The MS Lync presence server 102 aggregates presence information received from PAIF device 108 and device 3 124, which correspond to the same user, e.g., user A. The MS Lync presence server performs format conversion of aggregated presence information. The MS Lync Presence server 102 communicates aggregated presence information to other devices in the communications environment 100, e.g., which have registered to receive updated presence information or have requested presence information, e.g., corresponding to a particular user identifier.

User A, user B, and user N use the MS Lync presence server 102 for presence and address book services, while user C uses the Cisco Jabber including the Cisco presence server 116 for presence and address book services. User A uses device 1 118 with gtalk communications, device 2 120 with mobile cellular network communications, device 3 124 with MS Lync communications, and device 4 122, e.g., a desk phone with Internet packet based phone communications, for communications. The PAIF device 108 updates the presence state based on activity on user A's various identities, e.g., corresponding to devices 118, 120, 122. The MS Lync server 102 aggregates status information corresponding to device 3 124 with the status information communicated from PAIF device 108. The MS Lync Presence server 102 sends updated presence states to all the watchers, e.g., devices which have previously registered to receive status updates corresponding to user A. For example, consider that user B and user C are watching user A, then Lync presence server 102 will send the updated presence state pertaining to user A, to user B, e.g., device 126 and to user C, e.g., device 130. In this example, user C is in a different domain, and federation interface 150 is used to send the updated status.

In the exemplary communications environment 100, there are two levels of aggregation for presence information corresponding to user A, e.g., a first level performed by PAIF device 108 and a second level performed by MS Lync presence server 102. In some embodiments, the MS Lync presence server 102 in unaware that the presence information being communicated from PAIF device 108 to the MS Lync presence server is aggregated presence information corresponding to different user devices in different domains of different autonomous networks.

Figure 2B:
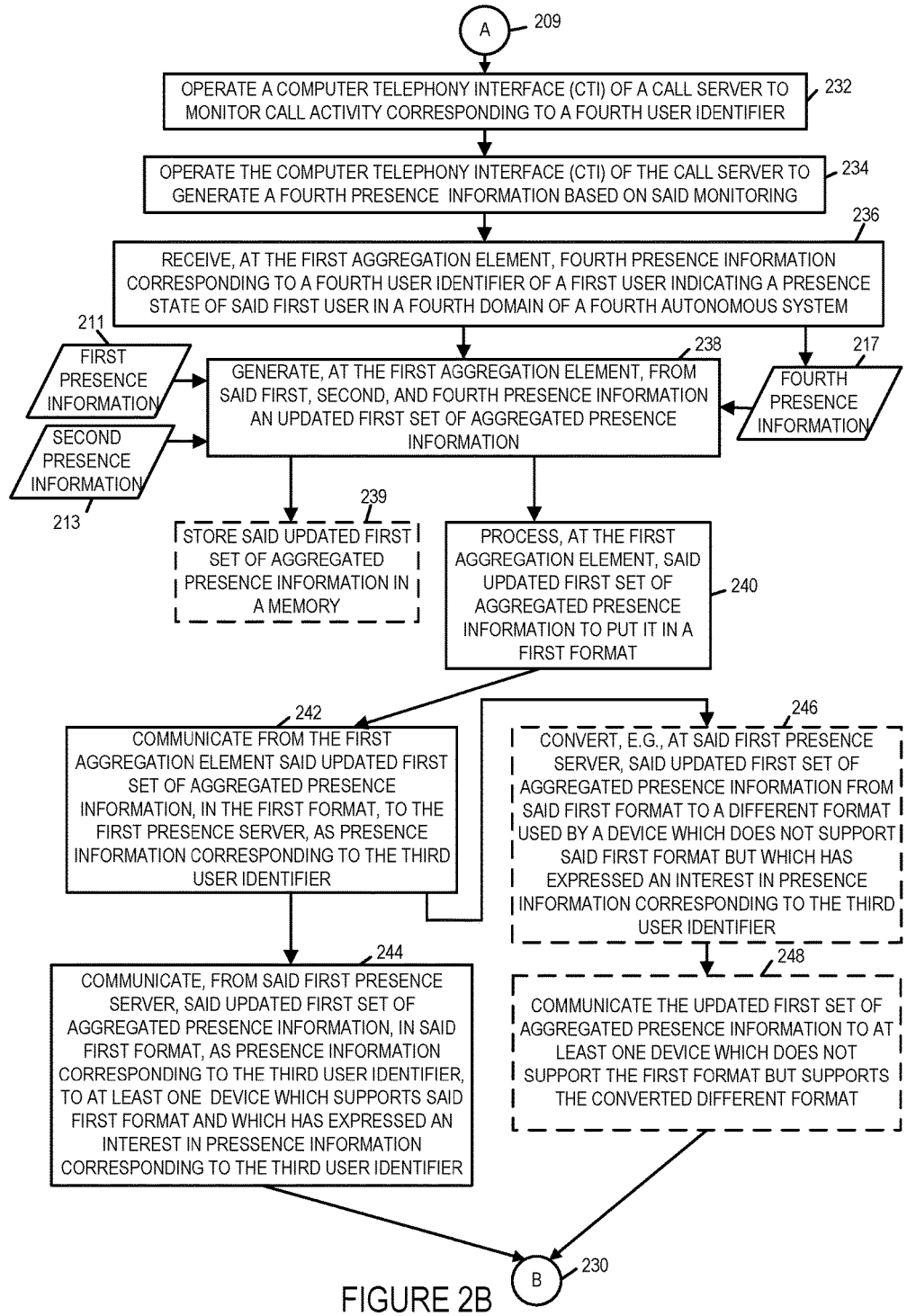
FIG. 2B is a second part of a flowchart of an exemplary method of providing presence information in a communications environment including multiple autonomous systems in accordance with an exemplary embodiment.
Figure 10:
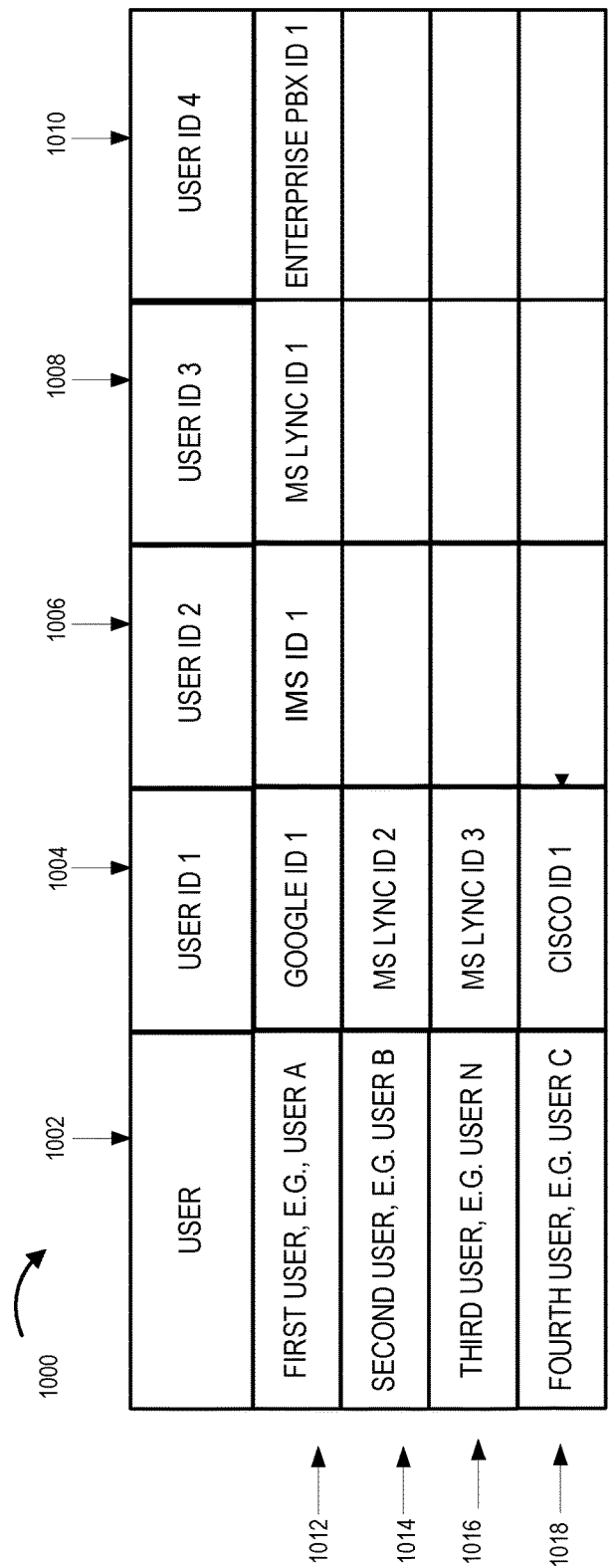
FIG. 10 illustrates an exemplary table 1000 which correlates users with user IDs.

FIG. 2, comprising the combination of FIG. 2A and FIG. 2B, is a flowchart 200 of an exemplary method of providing presence information in a communications environment including multiple autonomous systems, e.g., communications environment 100 of FIG. 1, in accordance with an exemplary embodiment. Operation starts in step 202 and proceeds to step 204, in which the system is initialized. During the initialization step, the user identities corresponding to each user are stored in memory, e.g., the user identifiers corresponding to the first user are associated in memory accessible to the PAIF device, e.g., PAIF memory 322, as corresponding to the first user. The stored user identities are then available for later use in the process for example during the aggregation of presence information for a user based on the user ids associated with the user. FIG. 10 provides an exemplary table 1000 generated during initiation corresponding to the users shown in FIG. 1 which may be, and in some embodiments is stored in PAIF memory 322. Each of the entries in rows 1012, 1014, 1016 and 1018 contains information associating the user identified in the entries of column 1002 with its known user IDs or aliases wherein the user's user ID 1 is contained in the entries in column 1004, the user's user ID 2 is contained in the entries of 1004, the user's user ID 3 is contained in the entries of column 1008 and the user's user ID 4 is contained in the entries s of column 1010. For example, the first user, e.g., user A (entry column 1002, row 1012) is associated with user ID 1 which is Google ID 1 (entry column 1004, row 1012), user ID 2 which is IMS ID 1 (entry column 1006, row 1012), user ID 3 which is MS Lync ID 1 (entry column 1008, row 1012), and user ID 4 Enterprise PBX ID 1 (entry column 1010, row 1012). The user IDs, e.g., MS Lync ID. 1, MS Lync ID. 2, Google ID 1, IMS ID 1, Enterprise PBX ID 1, and Cisco ID 1 are merely exemplary are merely used for illustrative purposes. Row 1014 of table 1000 associates the second user, e.g., user B (entry column 1002, row 1014) with user ID 1 which is MS Lync ID 2 (entry column 1004, row 1014). Row 1016 of table 1000 associates the third user, e.g., user N (entry column 1002, row 1016) with user ID 1 which is MS Lync ID 3 (entry column 1004, row 1016). Row 1018 of table 1000 associates the fourth user, e.g., user C (entry column 1002, row 1018) with user ID 1 which is Cisco ID 1 (entry column 1004, row 1018).

Operation proceeds from step 204 to step 206, step 208, and step 232, via connecting node A 209.

In step 206, monitoring is performed at a first aggregations element, e.g., PAIF device 108, for presence information. Operation proceeds from step 206 to step 210 and 212. In step 210 first presence information 211, corresponding to a first user identifier of a first user, e.g., user A, indicating a presence state of said first user in a first domain of a first autonomous system, e.g., system 156, is received at the first aggregation element. Returning to step 212, in step 212 second presence information 213, corresponding to a second user identifier of the first user device indicating a presence of state of said first user in a second domain of a second autonomous system, e.g., system 158, is received at the first aggregation element. Operation proceeds from step 210 and step 212 to step 214.

Figure 11:
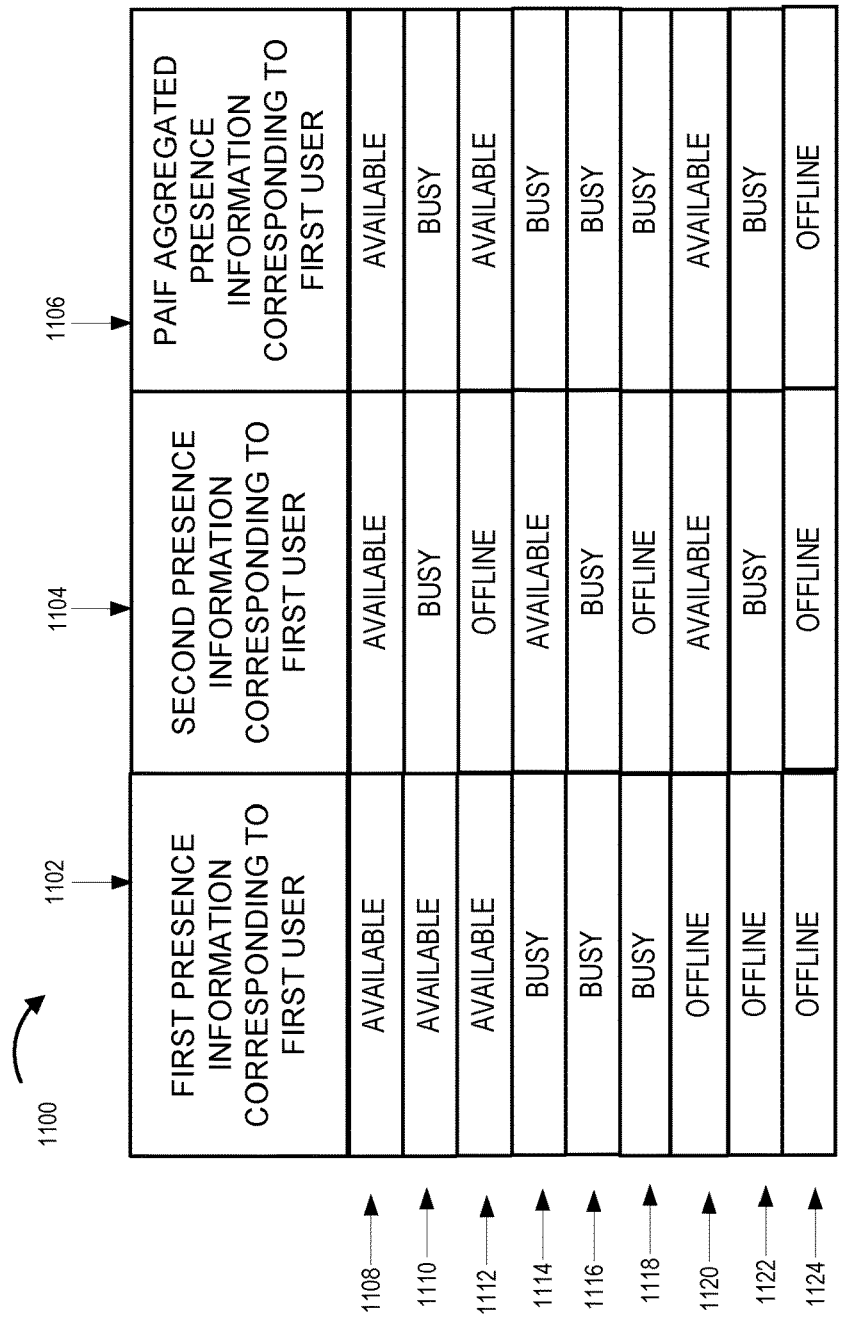
FIG. 11 illustrates an exemplary logic table that is used to generate aggregated presence information in accordance with one embodiment of the present invention.

In step 214 a first set of aggregated presence information is generated at the first aggregation element from the first and second presence information. In some embodiments the first set of aggregated presence information is generated by performing an ORing operation on the first presence information received corresponding to the first user identifier and the second presence information corresponding to a second user identifier of the first user. Table 1100 of FIG. 11 shows an exemplary logic table that illustrates the PAIF aggregated state for a first user based on the first presence information corresponding to a first user identifier of the first user indicating a presence state of said first user in a first domain of a first autonomous system and the second presence information corresponding to the second user identifier of the first user indicating a presence state of said first user in a second domain of a second autonomous system. The presence states used in this example are available, busy and offline. The entries of column 1102 provide the first presence information corresponding to the first user in the first domain of the first autonomous system. The entries of column 1104 provide the second presence information corresponding to the first user in the second domain of the second autonomous system. The entries of column 1106 provide the PAIF aggregated presence information that may be, and in some embodiments is, generated based on the first and second presence information contained in entries in the corresponding row of the table. Rows 1108, 1110, 1112, 1114, 1116, 1118, 1120, 1122, and 1124 associate a first presence information corresponding to a first user, a second presence information corresponding to a first user with the PAIF aggregated presence information generated from the corresponding first and second presence information. For example, if the first presence information received corresponding to the first user is a state of available (entry column 1102, row 1110) and the second presence information received corresponding to the first user is a state of busy (entry column 1104, row 1110) then the PAIF aggregated presence information corresponding to the first user that is generated is a state of busy (entry column 1106, row 1110).

Operation proceeds from step 214 to step 218, and in some embodiments, operation proceeds from step 214 to optional step 216. In step 216, the first set of aggregate presence information is stored in a memory, e.g., memory 117 of FIG. 1 or memory 314 of FIG. 3. In step 218, the first set of aggregated information is processed at the first aggregation element to put the first set of aggregated information in a first format. In some embodiments, the first set of aggregated information in the first format includes an aggregation indicator indicating that the information being communicated is aggregated information. In various embodiments, the first set of aggregated information in the first format is stored in a memory, e.g., memory 117 of FIG. 1 or memory 314 of FIG. 3. Operation proceeds from step 218 to step 220.

In step 220, the first set of aggregated presence information, in the first format, is communicated from the first aggregation element to a first presence server, e.g., MS Lync presence server 102, as presence information corresponding to a third user identifier. Operation proceeds from step 220 to step 222. In step 222, the first set of aggregated presence information, in said first format, as presence information corresponding to the third user identifier, is communicated from the first presence server to a device, e.g., device 3 124, in a third domain of a third autonomous system. In one exemplary embodiment the third device is an MS LYNC device.

In some embodiments, the first set of aggregated presence information is generated by a presence aggregation internetworking function module included in said first aggregation element. In some such embodiments, the first aggregation element is configured to interface between an IMS network and a MS Lync server. In some such embodiments, the first aggregation element is located in a device, e.g., PAIF device 108, positioned between the IMS network, e.g., IMS network 112, and the MS Lync server, e.g., MS Lync server 102. In some such embodiments, the MS Lync server is the first presence server.

In some embodiments, the first aggregation element is located in a device located in the IMS network. In some embodiments, the first aggregation element is located is located in a session border controller which is an edge device positioned at the edge of an IMS network.

Operation proceeds from step 222 to step 226.

Returning to step 208, in step 208 monitoring is performed at the first presence server for presence information. Operation proceeds from step 208 to step 224. In step 224, third presence information 215 corresponding to the third user identifier of the first user indicating a presence state of said first user on a third device, e.g., device 3 124, in a third domain of a third autonomous system is received at the first presence server. Operation proceeds from step 224 to step 226.

Figure 12:
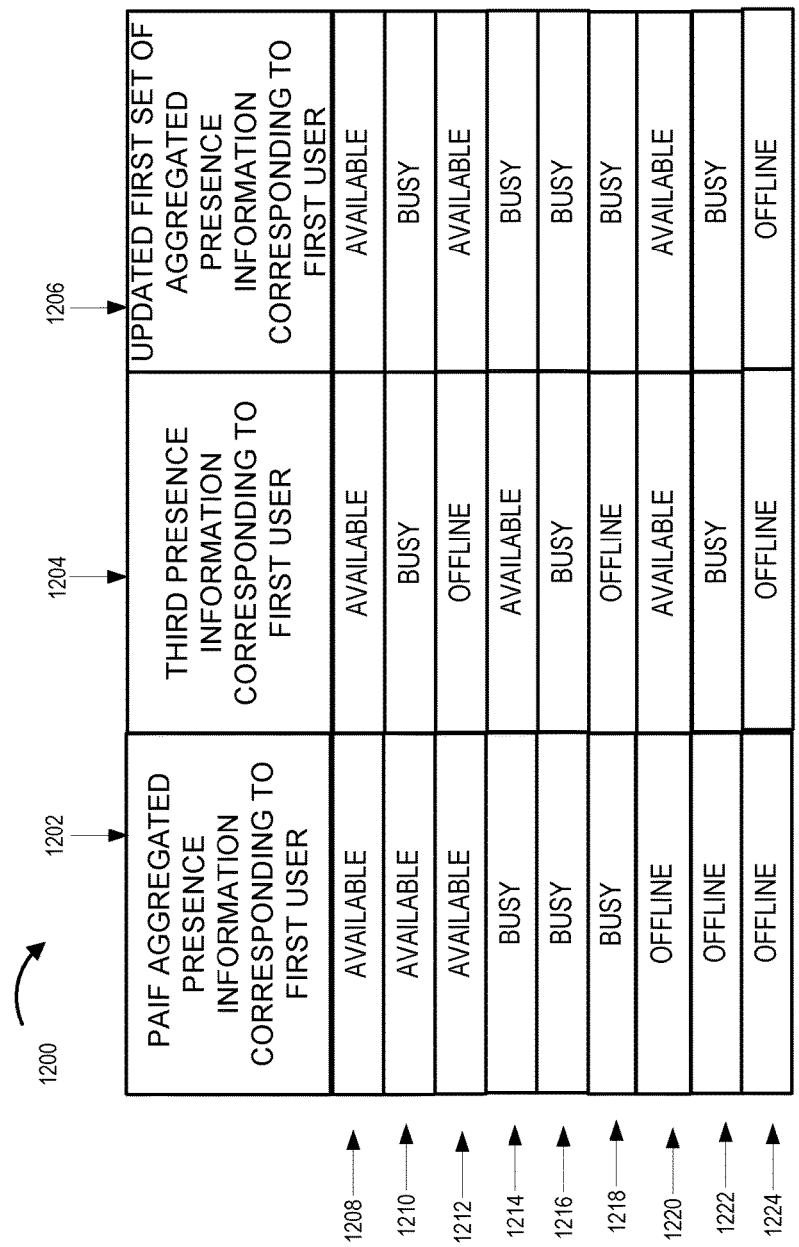
FIG. 12 illustrates an exemplary logic table that is used to generate updated aggregated presence information in accordance with one embodiment of the present invention.

In step 226 an updated first set of aggregated presence information in the first format is generated from the first set of aggregated presence information and the third presence information from said third device. In some embodiments the updated first set of aggregated presence information is generated by performing an ORing operation on the first set of aggregated presence information received corresponding to the third user identifier and the third presence information received from said third device. Table 1200 of FIG. 12 shows an exemplary logic table that illustrates the logic used to generate the updated first set of presence information corresponding to the first user from a first set of PAIF aggregated presence information corresponding to the first user and third presence information corresponding to the first user. The presence states used in this example are available, busy and offline. The entries of column 1202 provide the PAIF aggregated presence information corresponding to the first user. The entries of column 1204 provide the third presence information corresponding to the first user. The entries of column 1206 provide the updated first set of presence corresponding to the first user. The updated first set of presence information corresponding to the first user may be, and in some embodiments is, generated based on the first set of PAIF aggregated presence information and the third presence information corresponding to the first user contained in entries in the corresponding row of the table. Rows 1208, 1210, 1212, 1214, 1216, 1218, 1220, 1222, and 1224 associate PAIF aggregated presence information corresponding to a first user, third presence information corresponding to a first user with the updated first set of aggregated presence information generated from the corresponding PAIF aggregated and third presence information. For example, if the PAIF aggregated presence information received corresponding to the first user is a state of available (entry column 1202, row 1210) and the third presence information received corresponding to the first user is a state of busy (entry column 1204, row 1210) then the updated first set of aggregated presence information corresponding to the first user that is generated is a state of busy (entry column 1206, row 1210).

Operation proceeds from step 226 to step 228. In step 228 said updated first set of aggregated presence information in the first format is communicated to a device in the third domain, e.g., the third device, e.g., device 3 124, or another device in the third domain, e.g., device 5 126 or device N 126. In some embodiments, the first presence server is an MS Lync server, and the third identifier is an MS Lync ID. In some such embodiments, the first set of aggregated presence information is not indicated to be aggregated information. In some such embodiments, the first and second user identifiers are not MS Lync identifiers. Operation proceeds from step 228 via connecting node B 230 to the input of steps 206, 208 and 232.

Returning to step 232, in step 232 a computer telephony interface (CTI) of a call server, e.g., CTI 119 of call server 114, is operated to monitor call activity corresponding to a fourth user identifier. Operation proceeds from step 232 to step 234. In step 234 the computer telephony interface of the call server is operated to generate a fourth presence information based on said monitoring. Operation proceeds from step 234 to step 236. In step 236 fourth presence information 217 corresponding to a fourth user identifier of a first user indicating a presence state of said first user in a fourth domain of a fourth autonomous system, e.g., system 160, is received at the first aggregation element. Operation proceeds from step 236 to step 238. In step 238 an updated first set of aggregated presence information is generated at the first aggregation element from said first, second, and fourth presence information (211, 213, 215, 217).

In some embodiments the updated first set of aggregated presence information is generated in step 238 by performing an ORing operation on the first, second and third presence information received corresponding to the first user. For example, the exemplary logic illustrated in FIG. 11 may be extended to include the fourth presence information as will be understood by one of skill in the art. For example, if the first presence information is busy and the second presence information is available and the third presence information is offline the first set of updated aggregated presence information would be busy.

Operation proceeds from step 238 to step 240. In some embodiments, operation proceeds from step 238 to optional step 239.

Figure 3:
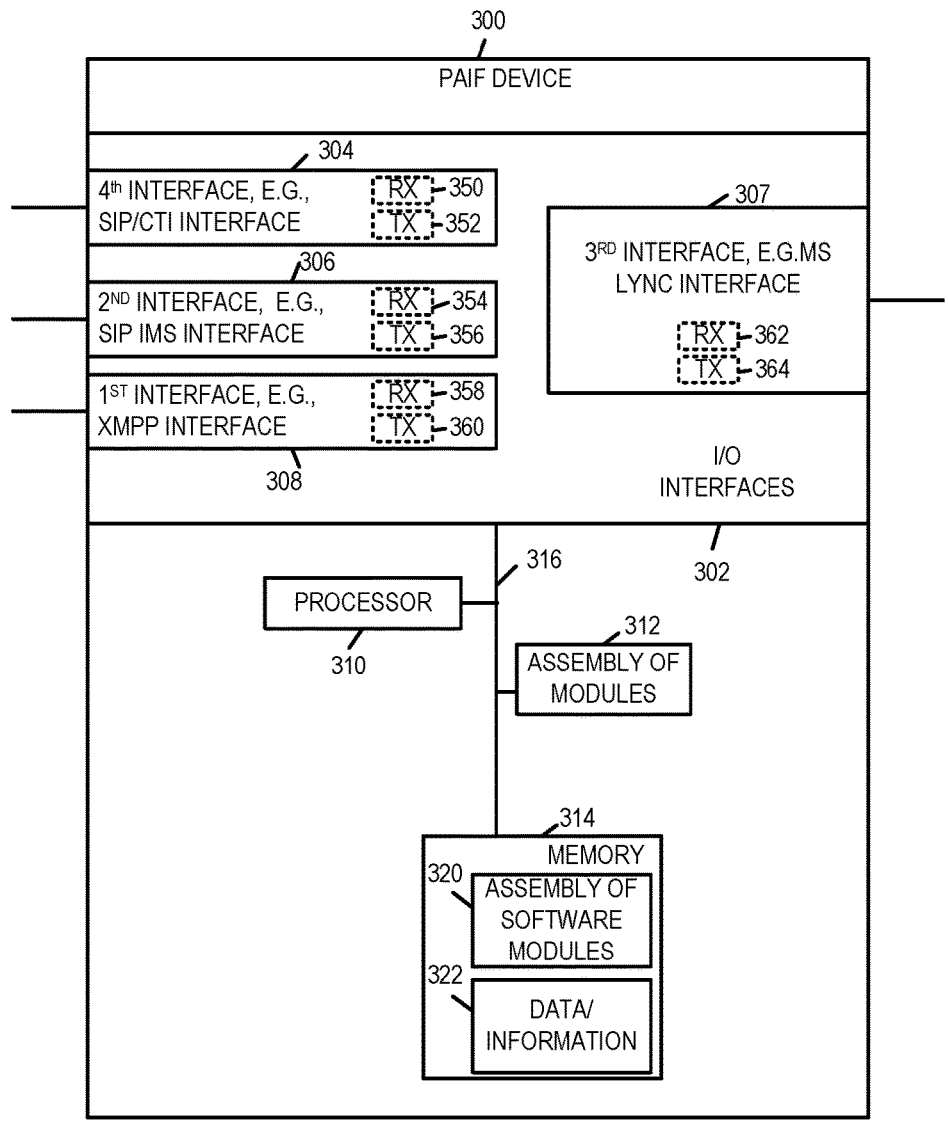
FIG. 3 illustrates an exemplary presence aggregation information interworking function (PAIF) device in accordance with an exemplary embodiment.

In step 239 the updated first set of aggregated presence information is stored in a memory, e.g., memory 117 of FIG. 1 or memory 314 of FIG. 3. In step 240 the updated first set of aggregated presence information is processed at the first aggregation element to put the updated first set of aggregated presence information in a first format. In various embodiments, the updated first set of aggregated information in the first format is stored in a memory, e.g., memory 117 of FIG. 1 or memory 314 of FIG. 3. Operation proceeds from step 240 to step 242.

In step 242 the updated first set of aggregated presence information, in the first format, is communicated from the first aggregation element to the first presence server, as presence information corresponding to the third user identifier. Operation proceeds from step 242 to step 244. In step 244 the updated first set of aggregated presence information, in said first format, as presence information corresponding to the third user identifier is communicated from the first presence server to at least one device which supports the first format and which has expressed an interest in presence information corresponding to the third user identifier, e.g., device 5 126. In some embodiments, the first presence information 211 corresponds to a first device, e.g., device 1 118; the second presence information 213 corresponds to a second device, e.g., device 2 120; the fourth presence information 217 corresponds to a fourth device, e.g., device 4 122; and the first, second and fourth devices correspond to the first user, e.g., user A. In some embodiments, the device which supports said first format and has expressed an interest in presence information corresponding to the third user identifier is a device which registered for presence updates corresponding to the first MS Lync ID or requested presence information for the first MS Lync ID which corresponds to the third user identifier.

In some embodiments, operation proceeds from step 242 to optional step 246. In step 246 the updated first set of aggregated presence information is converted from a first format to a different format used by a device which does not support said first format but which has expressed an interest in presence information corresponding to the third user identifier. In various embodiments, step 242 is performed by the first presence server. In some embodiments, the third presence information 215 includes user state information in an MS Lync format, and said first, second, and fourth domains are domains in which MS Lync is not used to communicate presence information. Operation proceeds from step 246 to step 248. In step 248 the updated first set of aggregated presence information is communicated to at least one device which does not support the first format but supports the converted different format. In various embodiments, step 248 is performed by the first presence server which sends the updated first set of aggregated presence information in the converted format to a device which does not support the first format, e.g., to device C 130. In one example, the communications path from the MS Lync presence server to device C 130 traverses XMPP gateway 104 and Cisco Presence server 116.

Operation proceeds from step 244 and/or step 248, via connecting node B 230 to the inputs of step 206, 208 and 232.

In some embodiments, the first presence information is presence information generated by a Web server, e.g., Web server 109, and the first presence information corresponds to a smart phone, e.g., device 1 118 which is a smart phone.

In some embodiments, the first presence information includes user state information in an XML (eXtensible Markup Language) format, and said first domain is a domain in which XML is used to communicate presence information. In some such embodiments, the XML format is XMPP (eXtensible Messaging and Presence Protocol) format.

In various embodiments, the second user identifier is an IMS ID and the second presence information 213 is information obtained from SIP signaling corresponding to devices using said IMS ID or location signaling corresponding to devices using said IMS ID, e.g. device 2 120. In some such embodiments, in step 215 the first set of aggregated presence information is stored in a home subscriber server memory, e.g., memory 117, corresponding to said IMS ID. In some other embodiments, the first set of aggregated presence information is stored in memory within the first aggregation element, e.g., memory 314 in device 300, which may be PAIF device 108.

In some embodiments, the second presence information 213 includes SIP session information from a call server control entity, e.g., a S-CSCF, e.g., S-CSCF 113.

In various embodiments, the first and second presence information (211, 213) each include one or more of the following: user registration status; user in call status or IDLE status; user location; access network capability information; and user device capability information, e.g., device audio and/or device video capability information.

In one exemplary embodiment, the communications environment is communications environment 100 of FIG. 1; the first aggregation element is PAIF device 108; the first presence server is MS Lync presence server 102; the first device is user A's PC/smart phone 118 including Google login; the second device is user A's mobile 120 having an IMS ID; the third device is user A's PC/smartphone 124 including Lync login; and the third device is user A's desk phone 122; the first autonomous system is system 156; the second autonomous system is system 158; the fourth autonomous system is system 160; the third autonomous system is a system including device 3 124, device 5 126, device N 128, and MS Lync presence server 102.

FIG. 3 is a drawing of an exemplary PAIF device 300 in accordance with an exemplary embodiment. Exemplary PAIF device 300 is, e.g., PAIF device 108 of FIG. 1. Exemplary PAIF device 300 includes I/O interfaces 302, a processor 310 an assembly of modules 312, and memory 314, coupled together via a bus 316 over which the various elements may interchange data and information. I/O interfaces 302 includes a plurality of interfaces including a first interface 308, e.g., a XMPP interface, a second interface 306, e.g., a SIP IMS interface 306, a third interface 307, e.g., a MS Lync interface, and a fourth interface 308, e.g., a SIP/CTI interface. Memory 314 includes an assembly of software modules 320 and data/information 322. In some embodiments, the first interface 308 includes a receiver 358 and a transmitter 360. In some embodiments, the second interface 306 includes a receiver 354 and a transmitter 356. In some embodiments, the third interface 307 includes a receiver 362 and a transmitter 364. In some embodiments, the fourth interface 304 includes a receiver 350 and a transmitter 352.

First interface 308, e.g., a XMPP interface, is configured to receive first presence information corresponding to a first user identifier of a first user indicating a presence state of said first user in a first domain of a first autonomous system. Second interface 306, e.g., a SIP IMS interface, is configured to receive second presence information corresponding to a second user identifier of the first user indicating a presence state of said first user in a second domain of a second autonomous system. In various embodiments, the first and second user identifiers are not MS Lync identifiers. Fourth interface 308, e.g., a SIP/CTI interface, is configured to receive fourth presence information corresponding to a fourth user identifier of the first user indicating a presence state of said first user in a fourth domain of a fourth autonomous system. In various embodiments, the fourth user identifier is not an MS Lync identifier.

Third interface 307, e.g., a MS Lync interface, is configured to communicate, e.g., transmit, a set of aggregated presence information, in a first format, to a presence server. For example, third interface 307 is configured to communicate a first set of aggregated presence information, in a first format to a first presence server, as presence information corresponding to a third user identifier. In some embodiments, the first presence server is an MS Lync server, e.g., MS Lync Presence server 102, and the third identifier is an MS Lync ID.

Third interface 307, e.g., a MS Lync interface, is further configured to communicate an updated first set of aggregated presence information, in the first format, to the first presence server, as presence information corresponding to the third user identifier.

In some embodiments, PAIF device 300 is configured to interface between an IMS network, and a MS Lync server. In some such embodiments, the PAIF device 300 is positioned between the IMS network and the MS Lync server. For example PAIF device 108, which may be PAIF device 300, is located between IMS network 158 and MS Lync Presence server 102. In some embodiments the PAIF device is located in the IMS network. In some embodiments, the PAIF device is located in a border session controller which is an edge device positioned at the edge of the IMS network.

Figure 4:
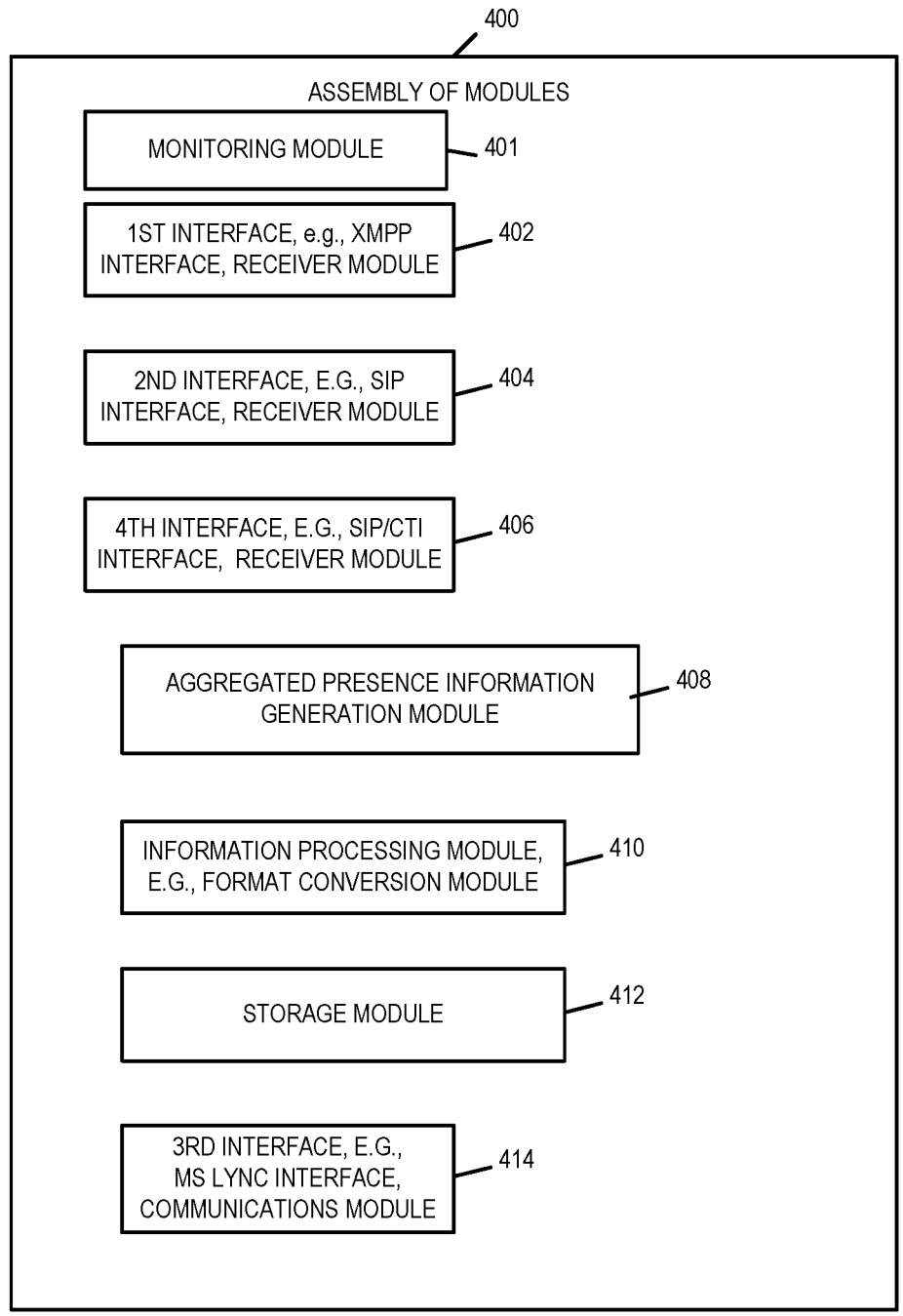
FIG. 4 illustrates an exemplary assembly of modules which may be included in a PAIF device in accordance with an exemplary embodiment.

FIG. 4 is a drawing of assembly of modules 400 which may be, and in some embodiments is, included in exemplary PAIF device 300 illustrated in FIG. 3. The modules in the assembly of modules 400 may, and in some embodiments are, implemented fully in hardware within the processor 310, e.g., as individual circuits. The modules in the assembly of modules 400 may, and in some embodiments are, implemented fully in hardware within the assembly of modules 312, e.g., as individual circuits corresponding to the different modules. In other embodiments some of the modules are implemented, e.g., as circuits, within the processor 310 with other modules being implemented, e.g., as circuits within assembly of modules 312 and/or within I/O interfaces 202, external to and coupled to the processor 310. As should be appreciated the level of integration of modules on the processor and/or with some modules being external to the processor may be one of design choice.

Alternatively, rather than being implemented as circuits, all or some of the modules included in assembly of modules 400 may be implemented in software and stored in the memory 314 of the PAIF device 300, with the modules controlling operation of PAIF device 300 to implement the functions corresponding to the modules when the modules are executed by a processor, e.g., processor 310. In some such embodiments, the assembly of modules 400 is included in the memory 314 as assembly of modules 320. In still other embodiments, various modules in assembly of modules 400 are implemented as a combination of hardware and software, e.g., with another circuit external to the processor providing input to the processor 310 which then under software control operates to perform a portion of a module's function. While shown in the FIG. 3 embodiment as a single processor, e.g., computer, it should be appreciated that the processor 310 may be implemented as one or more processors, e.g., computers.

When implemented in software the modules include code, which when executed by the processor 310, configure the processor 310 to implement the function corresponding to the module. In embodiments where the assembly of modules 400 is stored in the memory 314, the memory 314 is a computer program product comprising a computer readable medium comprising code, e.g., individual code for each module, for causing at least one computer, e.g., processor 310, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 4 control and/or configure the PAIF device 300 or elements therein such as the processor 310, to perform functions of corresponding steps illustrated in the method flowchart 200 of FIG. 2. Thus the assembly of modules 400 includes various modules that perform functions of corresponding steps of the method shown in FIG. 2.

Assembly of modules 400 includes a monitoring module 401, a first interface receiver module 402, a second interface receiver module 404, a fourth interface receiver module 406, an aggregated presence information generation module 408, an information processing module 410, a storage module 412, and a third interface communications module 414. Monitoring module 401 is configured to monitor for presence information, e.g., presence information being received via first interface 308, second interface 306, and fourth interface 304.

First interface receiver module 402, e.g., a receiver module configured to receive signals via first interface 308, e.g., a XMPP interface, is configured to receive first presence information corresponding to a first user identifier of a first user indicating a presence state of said first user in a first domain of a first autonomous system. Second interface receiver module 404, e.g., a receiver module configured to receive signals via a second interface 306, e.g., a SIP IMS interface, is configured to receive second presence information corresponding to a second user identifier of the first user indicating a presence state of said first user in a second domain of a second autonomous system. Fourth interface receiver module 406, e.g., a receiver module configured to receive signals via a fourth interface 304, e.g., a SIP/CTI interface, is configured to receive fourth presence information corresponding to a fourth user identifier of the first user indicating a presence of state of said first user in a fourth domain of a fourth autonomous system.

Aggregated presence information generation module 408 is configured to generate from received presence information, a set of aggregated presence information. For example, aggregated presence information generation module 408 is configured to generate from first and second presence information a first set of aggregated presence information. In some such embodiments, the first set of aggregated presence information is not indicated to be aggregated information. In some such embodiments, the first and second user identifiers are not MS Lync identifiers. As another example, aggregated presence information generation module 408 is further configured to generate from first, second and fourth presence information an updated first set of aggregated presence information. In some such embodiments, the updated first set of aggregated presence information is not indicated to be aggregated information. In some such embodiments, the first, second, and fourth user identifiers are not MS Lync identifiers.

Information processing module 410 is configured to process a set of aggregated information to put it in a first format. For example, information processing module 410 is configured to process a first set of aggregated information to put it in a first format. In some embodiments, the first format is a format used in MS Lync communications. In some embodiments, the first set of aggregated information in the first format includes an aggregation indicator indicating that the information being communicated is aggregated information. As another example, the information processing module 410 is configured to process an updated first set of aggregated information to put in a first format.

Storage module 412 is configured to store a generated set of aggregated information and a processed set of generated aggregated information, e.g., within data/information 322 of memory 314 of PAIF device 300.

Third interface communications module 414, e.g., a MS Lync communication module, is configured to communicate, e.g., transmit, via third interface 307, e.g., a MS Lync interface, a set of aggregated presence information in a first format to a presence server. For example, third interface communications module 414 is configured to communicate a first set of aggregated presence information in a first format to a first presence server, as presence information corresponding to third user identifier.

Figure 5:
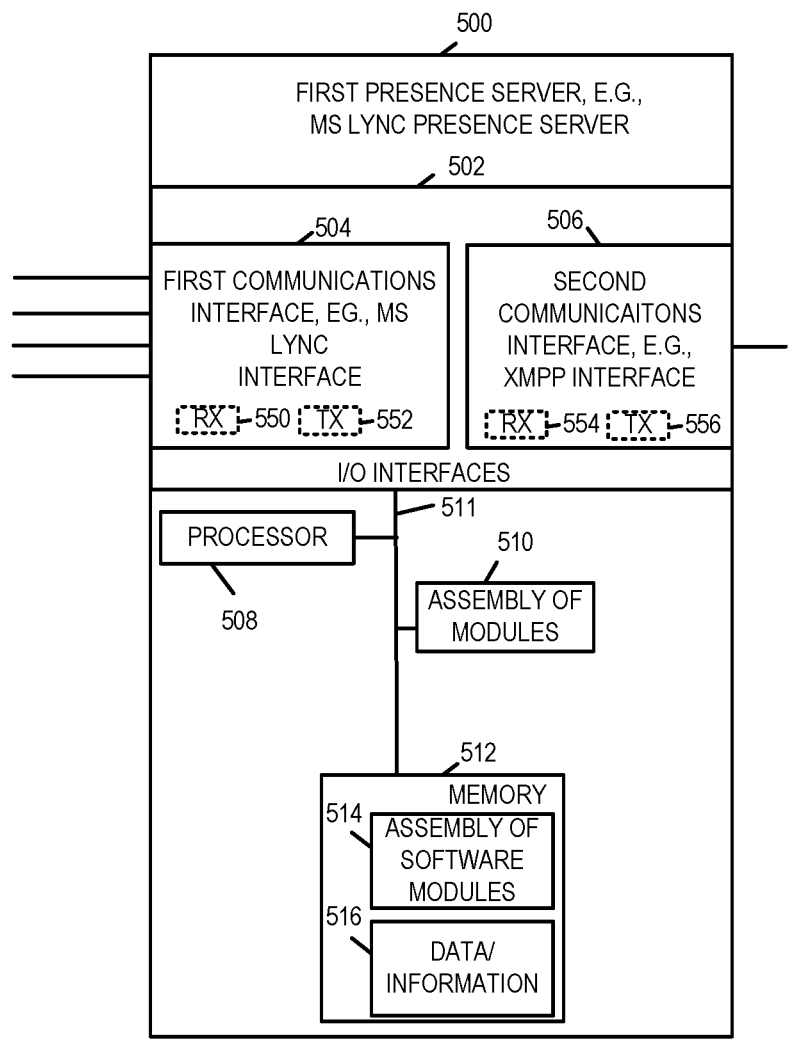
FIG. 5 illustrates an exemplary first presence server, e.g., a MS Lync presence server, in accordance with an exemplary embodiment.

FIG. 5 is a drawing of an exemplary first presence server 500, e.g., a MS Lync presence server, in accordance with an exemplary embodiment. Exemplary first presence server 500 is, e.g., MS Lync presence server 102 of FIG. 1. Exemplary first presence server 500 includes I/O interfaces 502, a processor 508, an assembly of modules 510, e.g., an assembly of circuits, and memory 512, coupled together via a bus 511 over which the various elements may interchange data and information. I/O interfaces 502 includes a plurality of interfaces including a first communications interface 504, e.g., a MS Lync interface, and a second communications interface 506, e.g., an XMPP interface 506. In some embodiments, the first communications interface 504 includes a receiver 550 and a transmitter 552. In some embodiments, the second communications interface 506 includes a receiver 554 and a transmitter 556. Memory 512 includes an assembly of software modules 514 and data/information 516.

Exemplary first communications interface 504, e.g., a MS Lync interface, couples the first presence server 500 to a plurality of devices which support communications using a first format. For example, first communications interface 504 in MS Lync presence server 102 coupled the MS Lync presence server to PAIF device 108 via link 138, to device 3 124 via link 144, to device 5 126 via link 146, and to device N 128 via link 148.

First communications interface 504 is configured to communicate, e.g., transmit, from the first presence server 500 a set of aggregated presence information in a first format. For example, first communications interface 504 is configured to communicate, e.g., transmit, from said first presence server 500 a first set of aggregated presence information in a first format, as presence information corresponding to a third user identifier to a device in a third domain of a third autonomous system. The device in a third domain of a third autonomous system is, e.g., a MS Lnyc device. In one example, the device in a third domain of a third autonomous system is device 3 124 of FIG. 1. For example, MS Lync presence server 102 transmits a set of aggregated presence information corresponding to user A via first communications interface 504 over link 144 to device 3 124.

First communications interface 504 is further configured to receive third presence information corresponding to a third user identifier of a first user device indicating presence state of said first user on a third device in said third domain of a third autonomous system. For example, MS Lync presence server 102 receives, via first communications interface 504, third presence information sent from device 3 124 over link 144. In some embodiments, the first presence server 500 is an MS Lync server, and the third user identifier is an MS Lync ID.

First communications interface 504 is further configured to receive a first set of aggregated presence information, e.g., from a PAIF device. In some embodiments, the first set of aggregated presence information is generated by a presence aggregation interworking function module included in an aggregation element, e.g., a PAIF device. First communications interface 504 is further configured to receive an updated first set of aggregated presence information, e.g., from the PAIF device.

First communications interface 504 is further configured to communicate, e.g., transmit, an updated first set of aggregated presence information in a first format to a device in the third domain. For example, an updated set of aggregated information is communicated, e.g., transmitted, via the first communications interface 504 of MS Lync presence server 102 to device 3 124, device 5 126, and/or device N 126.

Second communications interface 506, e.g., an XMPP interface, couples the first presence server 500 to a device communicating using a different format than the first format. For example, MS Lync presence server 102, which may be the first presence server 500, is coupled via second communications interface 506, e.g., an XMPP interface, to XMPP gateway 104.

Figure 6:
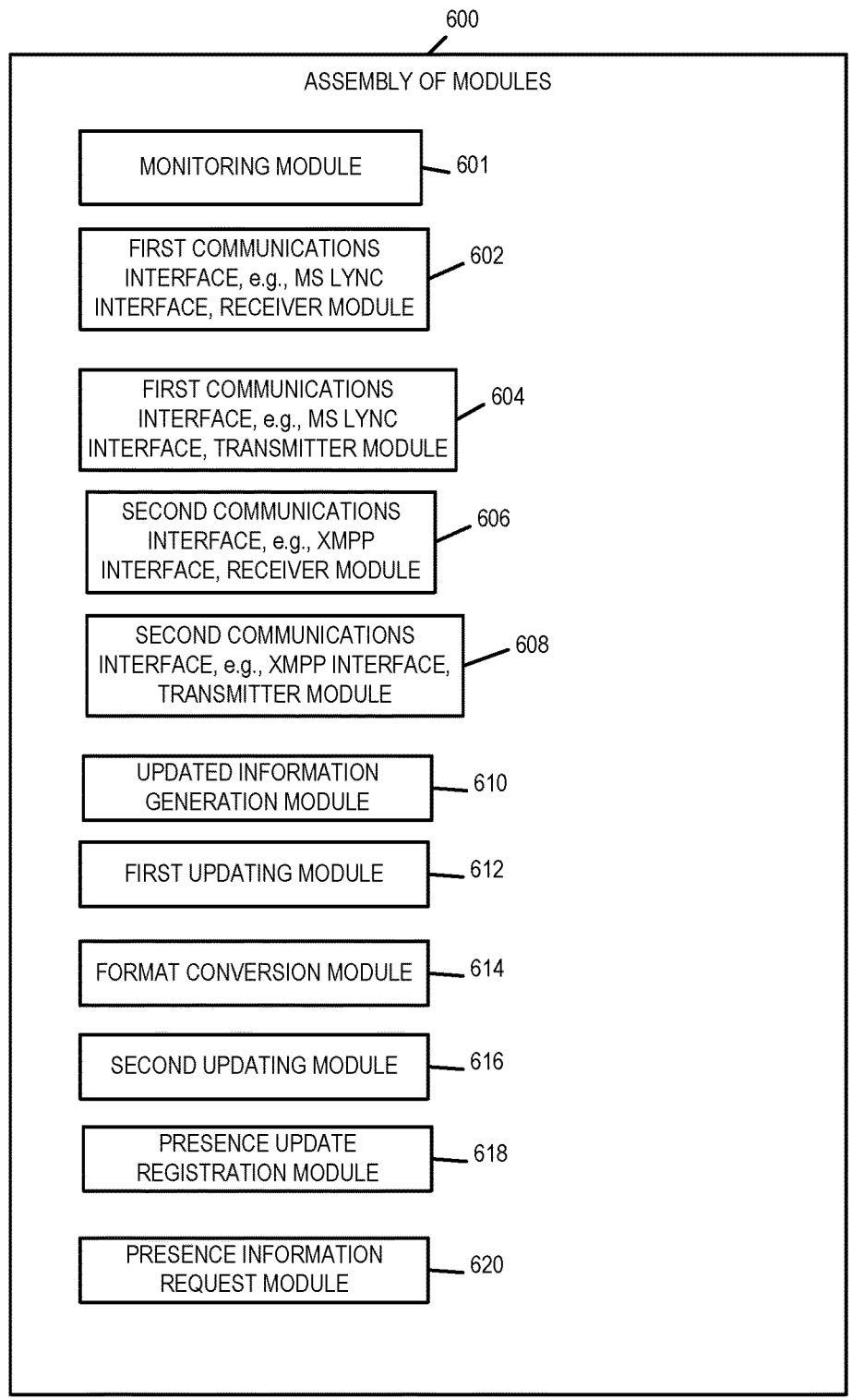
FIG. 6 illustrates an exemplary assembly of modules which may be included in a first presence server, e.g., a MS Lync server, in accordance with an exemplary embodiment.

FIG. 6 is a drawing of assembly of modules 600, which can be, and in some embodiments is, included in the exemplary first presence server 500, e.g., a MS Lync presence server, illustrated in FIG. 5. The modules in the assembly of modules 600 can, and in some embodiments are, implemented fully in hardware within the processor 508, e.g., as individual circuits. The modules in the assembly of modules 600 can, and in some embodiments are, implemented fully in hardware within the assembly of modules 510, e.g., as individual circuits corresponding to the different modules. In other embodiments some of the modules are implemented, e.g., as circuits, within the processor 508 with other modules being implemented, e.g., as circuits within assembly of modules 510 and/or within I/O interfaces 502, external to and coupled to the processor. As should be appreciated the level of integration of modules on the processor and/or with some modules being external to the processor may be one of design choice.

Alternatively, rather than being implemented as circuits, all or some of the modules including in assembly of modules 600 may be implemented in software and stored in the memory 512 of the first presence server 500, with the modules controlling operation of first presence server 500 to implement the functions corresponding to the modules when the modules are executed by a processor, e.g., processor 508. In some such embodiments, the assembly of modules 600 is included in the memory 512 as assembly of modules 514. In still other embodiments, various modules in assembly of modules 600 are implemented as a combination of hardware and software, e.g., with another circuit external to the processor providing input to the processor 508 which then under software control operates to perform a portion of a module's function. While shown in the FIG. 5 embodiment as a single processor, e.g., computer, it should be appreciated that the processor 508 may be implemented as one or more processors, e.g., computers.

When implemented in software the modules include code, which when executed by the processor 508, configure the processor 508 to implement the function corresponding to the module. In embodiments where the assembly of modules 600 is stored in the memory 512, the memory 512 is a computer program product comprising a computer readable medium comprising code, e.g., individual code for each module, for causing at least one computer, e.g., processor 508, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the first presence server 500 or elements therein such as the processor 508, to perform functions of corresponding steps illustrated in the method flowchart 200 of FIG. 2. Thus the assembly of modules 600 includes various modules that perform functions of corresponding steps of the method shown in FIG. 2.

Assembly of modules 600 includes a monitoring module 601, a first communications interface, e.g., MS Lync interface, receiver module 602, a first communications interface, e.g., MS Lync interface, transmitter module 604, a second interface, e.g., a XMPP interface, receiver module 606, a second interface, e.g., a XMPP interface, transmitter module 608, an update information generation module 610, a first updating module 612, a format conversion module 614, a second updating module 616, a presence update registration module 618, and a presence information request module 620. Monitoring module 601 is configured to monitor for presence information, e.g., presence information being received via first communications interface 504.

First communications interface receiver module 602 is configured to receive, via first communication interface 504, a set of aggregated presence information corresponding to a first user from a PAIF device, and presence information corresponding to the first user from one or more additional user devices. For example, the first communications interface receiver is configured to receive third presence information corresponding to the third user identifier of the first user indicating a presence state of the first user on a third device in said third domain of said third autonomous system.

First communications interface transmitter module 604 is configured to transmit, via the first communications interface 504, a first set of aggregated presence information in said first format, as presence information corresponding to the third user identifier to a device in a third domain of a third autonomous system. In one example, in which the first presence server 500 is MS Lync server 102, the device in the third domain of a third autonomous system is, e.g., device 3 124, which is an MS LYNC device. First communications interface transmitter module 604 is further configured to transmit, via the first communications interface 504, an updated first set of aggregated presence information in said first format, as presence information corresponding to the third user identifier to a device in a third domain of a third autonomous system. In one example, in which the first presence server 500 is MS Lync server 102, the device in the third domain of a third autonomous system is, e.g., device 3 124 or another device in the third domain, e.g., device 5 126, which is an MS LYNC device.

Second communications interface receiver module 606 is configured to receive, via second communication interface 506 signals including, e.g. presence information, a request to register to receive presence updates, a request for presence information, etc.

First communications interface transmitter module 608 is configured to transmit, via the second communications interface 506, aggregated presence information corresponding to user, e.g., an updated first set of presence information to a device which does not support the first format.

Updated information generation module 610 is configured to generate from a first set of aggregated presence information and third presence information from a third device an updated first set of aggregated presence information in the first format.

First updating module 612 is configured to control the first presence server to communicate, via said first communications interface, said updated first set of aggregated presence information, in said first format as presence information corresponding to the third user identifier, to at least one device which supports said first format and has expressed an interest in presence information corresponding to the third user identifier. A device may have expressed an interest by registering for presence updates corresponding to the first MS Lync ID or requested information for the first MS Lync ID which corresponds to the third user identifier.

Format conversion module 614 is configured to convert an updated first set of aggregated presence information from the first format to a different format used by a device which does not support the first format but has expressed an interest in presence information corresponding to the third user identifier.

Second updating module 616 is configured to control the first presence server to communicate, via a second communications interface, said updated first set of aggregated presence information to a device which does not support the first format.

Presence update registration module 618 is configured to receive and process requests from devices expressing an interest in presence information corresponding to a user ID, e.g., the third user identifier corresponding to the first user. A part of processing a request, a requesting device may be, and sometimes is, registered to receive updated presence information, e.g., on an ongoing basis as updates become available. As part of the registration, information is stored in a registration record as to the format in which the presence information is to be communicated, e.g., a first format, or a different format.

Presence information request module 620 is configured to receive and process requests from devices expressing an interest in presence information corresponding to a user ID, e.g., the third user identifier corresponding to the first user. In response to a request, a requesting device may be, and sometimes is, sent updated presence information.

In some embodiments, said first presence information corresponds to a first device, said second presence information corresponds to a second device and said fourth presence information corresponds to a fourth device, said first, second and fourth devices corresponding to the first user. In some embodiments, said third presence information includes user state information in an MS Lync format, said first, second and fourth domains being domains in which MS Lync is not used to communicate presence information.

In some embodiments, said first presence information is presence information generated by a Web server and wherein said first presence information corresponds to a smart phone. In some embodiments, said first presence information includes user state information in a XML (eXtensible Markup Language) format, said first domain being a domain in which XML is used to communicate presence information. In some embodiments, the XML format is XMPP (Extensible Messaging and Presence Protocol) format. In some embodiments, said second user identifier is an IMS ID; and the second presence information is information obtained from SIP signaling corresponding to devices using said IMS ID or location signaling corresponding to devices using said IMS ID. In some embodiments, the second presence information includes SIP session information from a call server control entity (e.g., S-CSCF).

In various embodiments, the first and second presence information each include one or more of the following: user registration status; user in call status or IDLE status; user location; access network capability information; and user device capability information, e.g., device audio and/or video capability information.

Various aspects and/or features or some embodiments, are further described below.

Figure 7:
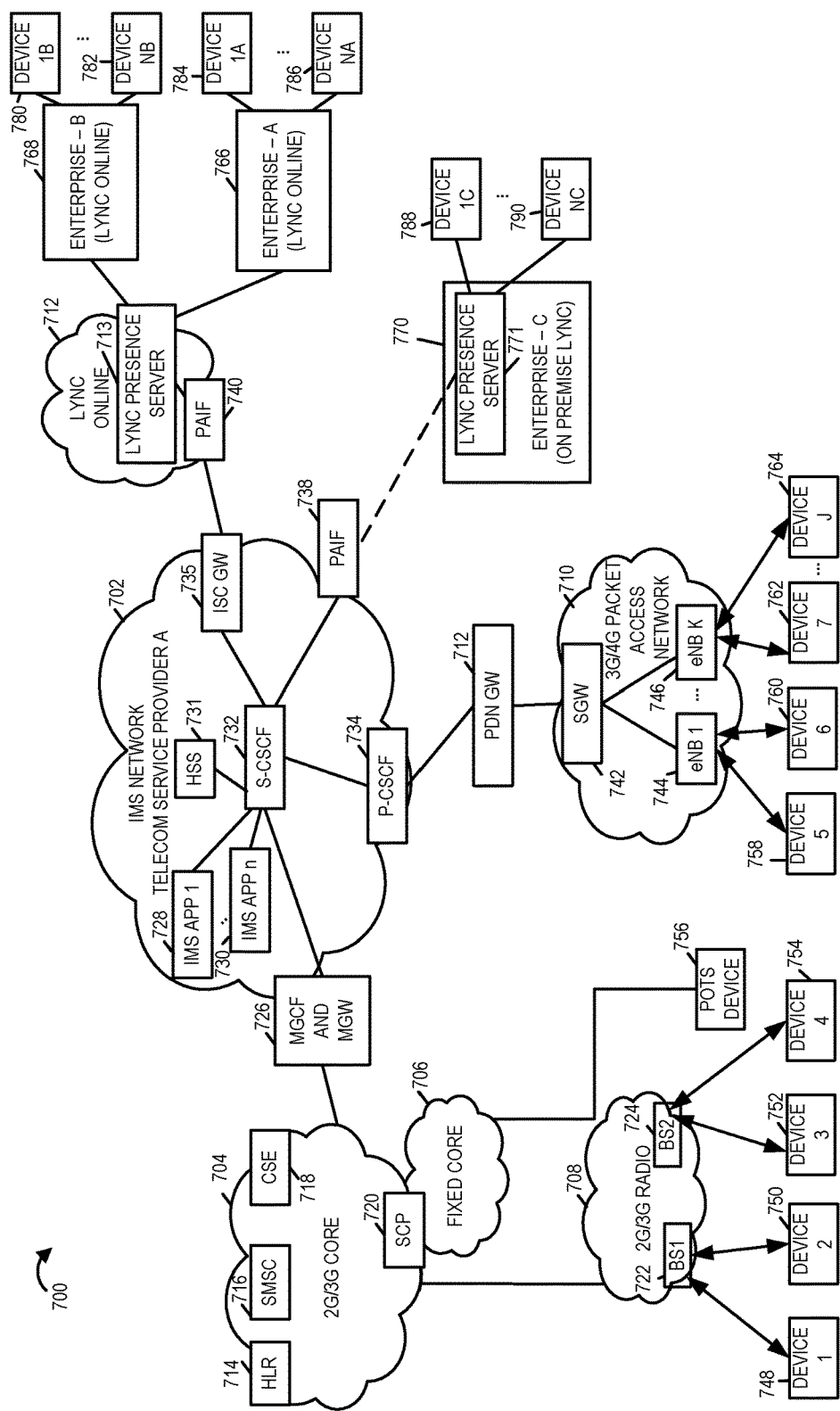
FIG. 7 illustrates an exemplary communications environment in accordance with one embodiment of the present invention.

FIG. 7 illustrates an exemplary communications environment 700 including a fixed core network 706, a 2G/3G radio network 708, a 2G/3G core network 704, a 3G/4G packet access network 710, an IMS network 702 corresponding to Telecom service provider A, a Lync online cloud 712, a first Enterprise PBX using Lync online, Enterprise A 766, a second Enterprise PBX using Lync online, Enterprise B 768, and a third Enterprise PBX using on premises Lync, Enterprise C 770.

A plain old telephone service (POTS) device 756 is connected to the fixed core network 706. The 2G/3G radio network 708 includes a plurality of base stations including exemplary base station 1 (BS 1) and base station 2 (BS 2). User device 1 748 and user device 2 750 are coupled to BS 1 722 via wireless links. User device 3 752 and user device 4 754 are coupled to BS 2 724 via wireless links. The 2G/3G core network 704 is coupled to the 2G/3G radio network 708. The 2G/3G core network includes a home location register (HLR) 714, a short message service center (SMSC) 716, circuit switched equipment (CSE) 718 and a service control point (SCP) 720. The SCP 720 interfaces the fixed core network 706 to the 2G/3G core network 704.

The 3G/4G packet access network 710 includes a plurality of eNode B devices (eNB 1 744, . . . , eNB K 746). User device 5 758 and user device 6 760 are coupled to eNB 1 744. User device 7 762 and user device J 764 are coupled to eNB K 746. The eNodeB devices (eNB 1 744, . . . , eNB K 746) are coupled to a serving gateway (SGW) 742.

IMS network 702 includes a plurality of IMS Application servers (IMS APP 1 728, . . . , IMS APP n 730), a media gateway control function and media gateway (MGCF and MGW) device 726, a serving call session control function (S-CSCF) device 732, a home subscriber server (HSS) 731, a proxy call session control function (P-CSCF) device 734, an IMS service control gateway (ISC GW) 735, and a Presence Aggregation Information Interworking Function PAIF device 738. HSS 731, IMS APP 1 728, IMS APP n 730, MCGF and MGW device 726, a P-CSCF device 734, a ISC GW 735, and PAIF device 738, are coupled to the S-CSCF 732.

MGCF and MGW device 726 couples the IMS network 702 to the 2G/3G core network 704. P-CSCF 734 is coupled to a packet data network gateway (PDN GW) 712, which is coupled to the SGW 742 of 3G/4G packet access network 710. ISC GW 735 of IMS network 702 is coupled to PAIF device 740 of Lync online cloud 712.

Enterprise C 770 includes a Lync presence server 771, which is coupled to the PAIF device 738 of IMS network 702. A plurality of user devices (user device 1C 788, . . . , user device NC 790) are coupled to Lync Presence server 770 of Enterprise C 770. A plurality of user devices (user device 1A 784, . . . , user device NA 786) are coupled to Enterprise A 766. A plurality of user devices (user device 1B 780, . . . , user device NB 782) are coupled to Enterprise B 768. Lync Presence server 770 is coupled to PAIF 738.

Lync online cloud 712 includes a PAIF device 740 and a Lync Presence server 713, which are coupled together. Enterprise A 766 and Enterprise B 768 are coupled to Lync presence server 713.

A user may, and sometimes does, have multiple user devices, e.g., different user devices which may be used to access different autonomous systems, e.g., based on device capabilities and/or user subscription. A user may, and sometimes does, have different user IDs corresponding to different systems, e.g., an ID corresponding to a 2G cellular network, an ID corresponding to a 4G packet network, a MS Lync ID, etc.

In one embodiment, the Presence Aggregation and Interworking Function (PAIF) is included in a module positioned between MS Lync and IMS Networks and/or clouds. In the example of FIG. 1, PAIF device 108 is positioned between MS Lync Presence server 102 and IMS network 112. In other embodiments, the Presence Aggregation and Interworking Function is deployed under a MS Lync cloud or as part of an IMS network. In the example, of FIG. 7, PAIF 740 is deployed under Lync cloud 712, e.g., an MS Lync cloud, and PAIF 738 is deployed as part of IMS network 702. When the PAIF is located in the IMS network facing the Lync Enterprises, the IMS operator is able to offer the enhanced presence service to MS Lync subscribers. When the PAIF is located in the MS Lync cloud facing the IMS Operator it enables the MS Lync cloud to expose standard SIP interfaces towards the IMS Operator.

In various embodiments, the IMS network 702, uses the standard IMS procedures as defined by 3GPP and chains in the Presence Aggregation & Interworking Function (738 or 740), as an IMS Application server for the subscriber. Chaining of the PAIF Application server (738 or 740) for a subscriber can be configured in the HSS 731 via 'IFCs— Initial Filter Criteria'. S-CSCF (732)/IMS core chains in the PAIF (738 or 740) (via ISC Gateway 745 in case PAIF 740 is in a different domain) in the following events:

Registration/Deregistration—S-CSCF 732 sends the third party registration/de-registration towards PAIF (738 or 740) when IMS Identity of the user registers or de-registers, Originating call—S-CSCF 732 chains in the PAIF (738 or 740) when IMS Identity of user initiates a call, Terminating call—S-CSCF 732 chains in the PAIF (738 or 740) when an incoming call is received for IMS Identity of user.

In accordance with a feature of various embodiments of the present invention, a Presence Aggregation and Interworking Function (PAIF) module, e.g. in a PAIF device such as PAIF 738 or PAIF 740, is introduced into a communications environment. In various embodiments, a PAIF is responsible for monitoring user activity, aggregating status information corresponding to a user, and communicating aggregated status information. The PAIF monitors user activity corresponding to an IMS ID. This includes monitoring user registration information, monitoring user on call information corresponding to incoming and/or outgoing calls, and monitoring user Idle information. The PAIF aggregates the presence status of the user based on user activity on the user's IMS ID and publishes the aggregated information to a MS Lync system.

Figure 8:
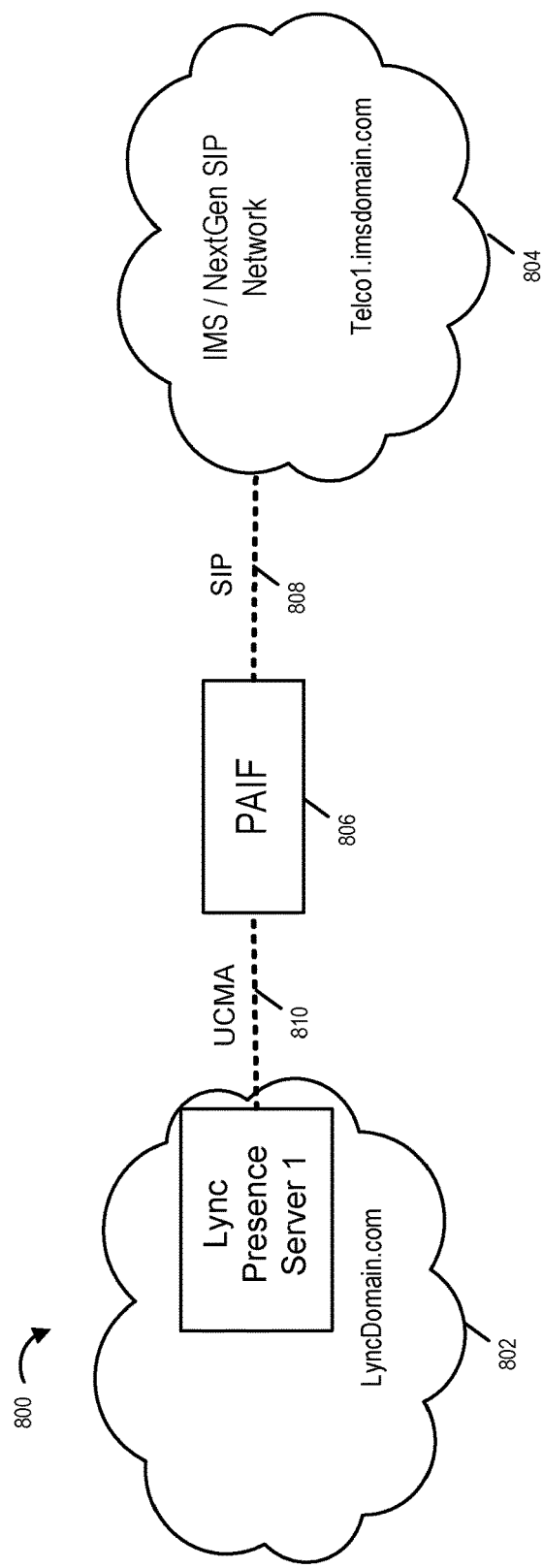
FIG. 8 is a drawing illustrating an exemplary Lync network coupled to an IMS network via a PAIF device.

FIG. 8 is a drawing 800 illustrating an exemplary Lync network 802 in the Lync domain, an exemplary IMS/NextGeneration SIP network 804 in the IMS domain, and a PAIF device 806 which bridges the two domains. The Lync network 802 includes an exemplary Lync presence server 804. SIP signals 808 flows between the IMS network and a first interface of the PAIF device 806. United Communications Managed API (UCMA) signals 810 flow between the Lync Presence server and a second interface of the PAIF device 806.

Exemplary Lync and IMS Presence aggregation procedures are described below. In some embodiments, the PAIF acts as a standard IMS Application Server (AS) relaying the SIP Requests and responses back to a S-CSCF node. The IMS AS may be, and in some embodiments is, a SIP proxy or back to back user agent (B2BUA) transparently relaying Session Description Protocol (SDP) information. The PAIF uses the knowledge of the SIP session corresponding to the IMS ID to establish the user's presence state.

The PAIF learns the location of a device using the user's IMS ID based on one or more of the following:

SIP Signaling headers, e.g., 'P-Access-Network-Info' and GeoLocation header, etc.;

Using interface to location database, e.g., HLR, HSS, etc.

The PAIF learns the User's activity on the user's devices with respect to the user's IMS ID based on one or more of the following:

by being chained in as an IMS AS by IMS core functions for calls and registrations;

by having an interface towards call server serving the User to learn its call activity, for example a CTI interface, or any notification mechanism.

The PAIF learns the user device capability on the user's IMS ID based on one or more of the following:

User and network Policy information stored in a database,

Capabilities of the Access network, which can be learned dynamically using SIP headers, e.g., 'P-Access-Network-Info', Capability of the device, which can be learned dynamically using SIP headers, e.g., 'User-Agent'.

In some embodiments, the PAIF establishes the users presence status based on one or more of the following:

User registration status;
User in call or IDLE;
User location;
Access network capabilities;
User device capability.

In some embodiments, the PAIF uses the open presence specification published by Microsoft, e.g., Microsoft's [MS-PRES]: Presence Protocol, for sharing the presence state of the user. In some embodiments, the PAIF sends a SIP PUBLISH request with pidf+xml payload representing IMS IDs presence state based on user activity.

User not de-Register→send Publish with presence state expired.

User Registered but IDLE→send Publish with presence state Available

User On call—incoming or outgoing calls→send Publish with presence state Busy

Figure 13:
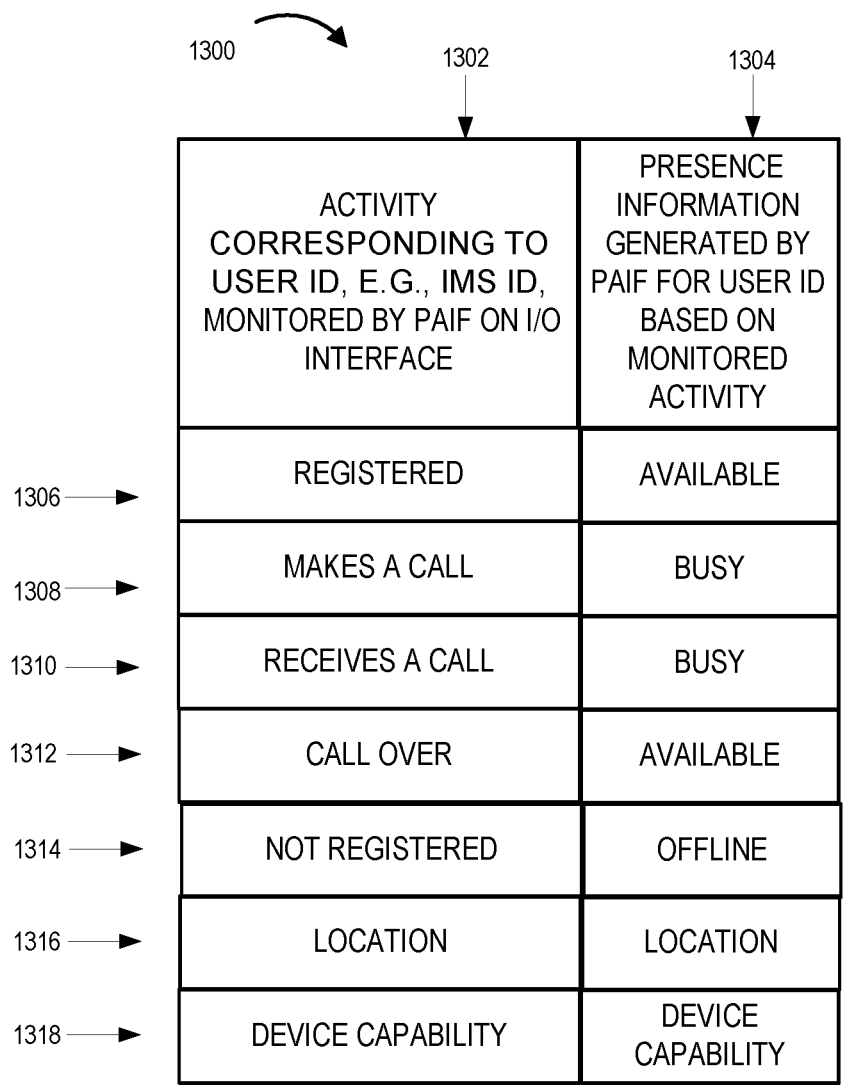
FIG. 13 illustrates an exemplary table that is used to generate presence information based on monitored activity in accordance with one embodiment of the present invention.

In some embodiments, the PAIF will send SIP Publish with IMS ID presence state to a Lync server in following events:

User registers→presence state Available
User de-registers/registration expired→presence state expired
User makes a call→presence state Busy
User receives a call→presence state Busy
User call is over→presence state Available Table 1300 of FIG. 13 illustrates exemplary presence information which may be, and in some embodiments, is, generated for a user ID by a PAIF device based on activity of a user's device detected by the PAIF device during monitoring of the activity of the user's device. In some such embodiments the PAIF device may be incorporated into an Enterprise PBX or an SBC. Each of the rows 1306, 1308, 1310, 1312, 1314, 1316, and 1316 contain two entries. The first entry of each of these rows corresponds to column 1302 and contains an activity which may be detected during monitoring of the activity corresponding to a user ID, e.g., an IMS ID, by the PAIF on one of the PAIF's I/O interfaces. The second entry of each of these rows corresponds to column 1304 and contains the corresponding presence information generated by the PAIF for the user ID based on the monitored activity contained in the entry of the first column of the row. The entries of row 1306 indicate that activity of being registered (entry row 1306, column 1302) correlates to a presence information state of available (entry row 1306, column 1304). The entries of row 1308 indicate that activity of making a call (entry row 1308, column 1302) correlates to a presence information state of busy (entry row 1308, column 1304). The entries of row 1310 indicate that activity of receiving a call (entry row 131-, column 1302) correlates to a presence information state of busy (entry row 1310, column 1304). The entries of row 1312 indicate that activity of call over (entry row 1312, column 1302) correlates to a presence information state of available (entry row 1312, column 1304). The entries of row 1314 indicate that activity of not registered (entry row 1314, column 1302) correlates to a presence information state of offline (entry row 1314, column 1304). The entries of row 1316 indicate that activity of detecting a location, e.g., through a SIP message, correlates to presence information indicating the location detected (entry row 1316, column 1304). The entries of row 1318 indicate that activity of detecting a device capability, e.g., through a SIP message, correlates to presence information indicating the device capability detected (entry row 1318, column 1304).

Figure 9:
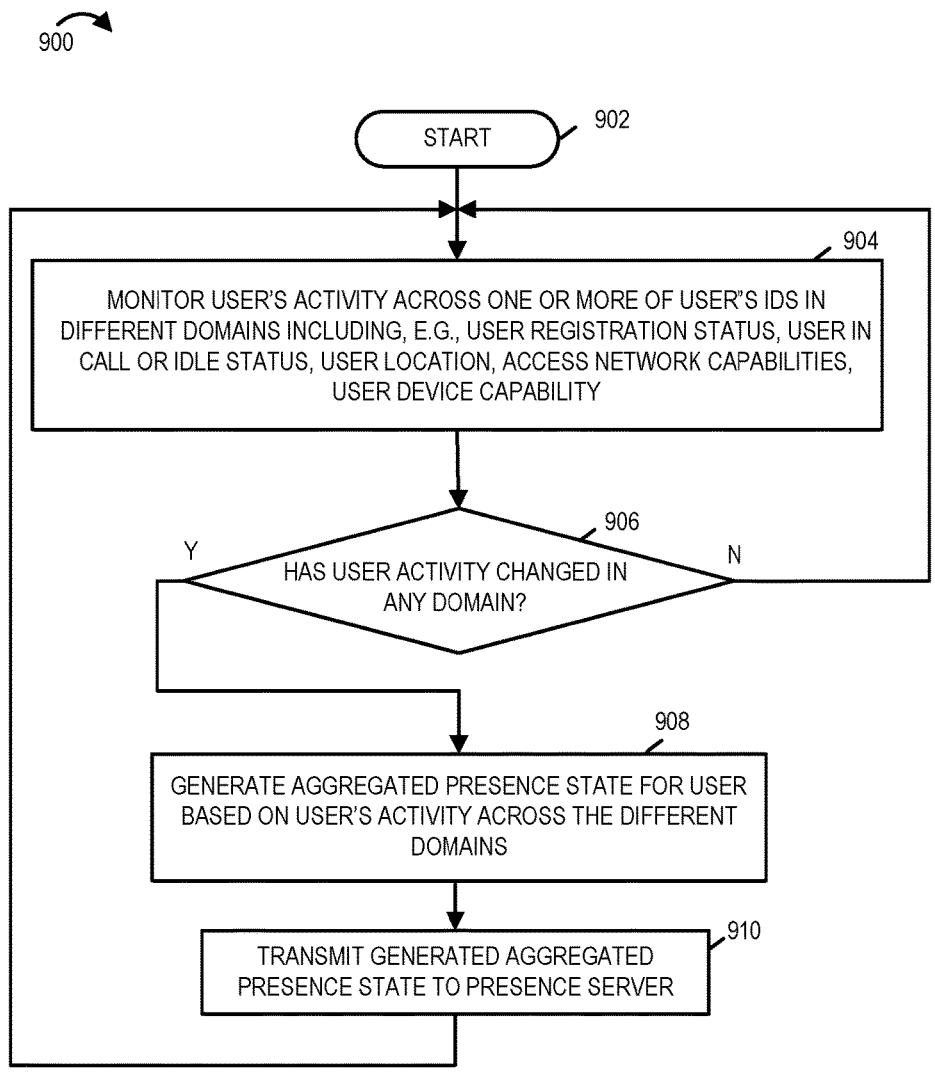
FIG. 9 is a flowchart of an exemplary method of operating a PAIF device in accordance with an exemplary embodiment.

FIG. 9 is a flowchart 900 of an exemplary method of operating a PAIF device in accordance with an exemplary embodiment. Operation starts in step 902 in which the PAIF device is powered on and initialized. Operation proceeds from step 902 to step 904, in which the PAIF device monitors a user's activity across one or more of a user's IDs in different domains, e.g., user registration status, user in call or idle status, user location, access network capabilities, user device capability. Operation proceeds from step 904 to step 906, in which the PAIF device determines if user activity has changed in any domain. If the PAIF determines that user activity has not changed, then operation proceeds from step 906 to step 904, in which the PAIF continues the monitoring. If the PAIF determines that user activity has changed, then operation proceeds from step 906 to step 908. In step 908 the PAIF device generates aggregated presence state for the user based on the user's activity across the different domains. Operation proceeds from step 908 to step 910. In step 910 the PAIF transmits the generated aggregated presence state to the presence server. Operation proceeds from step 910 to step 904 for additional monitoring.

An exemplary method of providing presence information in a communications environment including multiple autonomous systems, in accordance with some embodiments, comprises: receiving, at a first aggregation element, first presence information corresponding to a first user identifier of a first user indicating a presence state of said first user in a first domain of a first autonomous system; receiving, at the first aggregation element, second presence information corresponding to a second user identifier of the first user indicating a presence state of said first user in a second domain of a second autonomous system; generating, at the first aggregation element, from said first and second presence information a first set of aggregated presence information; and communicating from the first aggregation element said first set of aggregated presence information, in a first format, to a first presence server, as presence information corresponding to a third user identifier. In some embodiments, the exemplary method further comprises communicating, from said first presence server, said first set of aggregated presence information, in said first format, as presence information corresponding to the third user identifier, to a device, e.g., a 3rd device which is an MS LYNC device, in a third domain of a third autonomous system. In some such embodiments, the exemplary method further comprises: prior to communicating said first set of aggregated information to said presence server in the first format, processing, at said first aggregation element, said first set of aggregated information to put it in said first format. In some embodiments, said first set of aggregated information in the first format includes an aggregation indicator indicating that the information being communicated is aggregated information.

In some embodiments, the exemplary method includes receiving, at the first presence server, third presence information corresponding to said third user identifier of the first user indicating a presence state of said first user on a third device in said third domain of said third autonomous system; generating from said first set of aggregated presence information and said third presence information from said third device an updated first set of aggregated presence information in the first format; and communicating said updated first set of aggregated presence information, in the first format, to a device in said third domain, e.g., 3rd device or another device in the 3rd domain.

In some embodiments, said first set of aggregated presence information is generated by a presence aggregation internetworking function module included in said first aggregation element. In some such embodiments, said first aggregation element is configured to interface between an IMS network and a MS Lync server.

In some embodiments, said first aggregation element is located in a device positioned between the IMS network and the MS Lync Server; said MS Lync server is said first presence server. In some embodiments, first aggregation element is located in a device located in the IMS network. In some embodiments, said first aggregation element is located in a border session controller which is an edge device positioned at the edge of the IMS network. In some embodiments, the first aggregation element is location in a application server.

In various embodiments, first presence server is an MS LYNC server, and said third identifier is an MS Lync ID. In some such embodiments, said first set of aggregated presence information is not indicated to be aggregated information.

In some embodiments, said first and second user identifiers are not MS LYNC identifiers.

In various embodiments, the exemplary method includes receiving, at the first aggregation element, fourth presence information corresponding to a fourth user identifier of the first user indicating a presence state of said first user in a fourth domain of a fourth autonomous system; generating, at the first aggregation element, from said first, second and fourth presence information an updated first set of aggregated presence information; and communicating said updated first set of aggregated presence information, in the first format, to the first presence server, as presence information corresponding to the third user identifier.

In some embodiments, said first presence information corresponds to a first device, said second presence information corresponds to a second device and said fourth presence information corresponds to a fourth device, said first, second and fourth devices corresponding to the first user; and communicating, from said first presence server, said updated first set of aggregated presence information, in said first format, as presence information corresponding to the third user identifier, to at least one device which supports said first format and has expressed an interest (e.g., registered for presence updates corresponding to the first MS LYNC ID or request presence information for the first MS LYNC ID) in presence information corresponding to the third user identifier. In some such embodiments, the exemplary method further includes converting said updated first set of aggregated presence information from said first format to a different format used by a device which does not support said first format but which has expressed an interest in presence information corresponding to the third user identifier, prior to communicating said updated first set of aggregated presence information to the device which does not support said first format.

In some embodiments, said third presence information includes user state information in an MS Lync format, said first, second and fourth domains being domains in which MS Lync is not used to communicate presence information.

In some embodiments, said first presence information is presence information generated by a Web server and said first presence information corresponds to a smart phone. In some embodiments, first presence information includes user state information in a XML (eXtensible Markup Language) format, said first domain being a domain in which XML is used to communicate presence information. In some such embodiments, the XML format is XMPP (Extensible Messaging and Presence Protocol) format.

In various embodiments, the second user identifier is an IMS ID; and the second presence information is information obtained from SIP signaling corresponding to devices using said IMS ID or location signaling corresponding to devices using said IMS ID.

In various embodiments, the exemplary method includes storing said first set of aggregate presence information in a home subscriber server memory corresponding to said IMS ID. In some embodiments, the second presence information includes SIP session information from a call server control entity, e.g., a S-CSCF.

In some embodiments, said first and second presence information each include one or more of the following: user registration status; user in call status or IDLE status; user location; access network capability information; and user device capability information, e.g., device audio and/or video capability information.

In some embodiments, the exemplary method includes operating a CTI interface of a call server to monitor call activity corresponding to said fourth user identifier; and operating the CTI interface of said call server to generate said fourth presence information based on said monitoring.

An exemplary system, in accordance with some embodiments, includes a presence aggregation and interworking function (PAIF) device and a first presence server. The PAIF device includes a first interface configured to receive first presence information corresponding to a first user identifier of a first user indicating a presence state of said first user in a first domain of a first autonomous system; a second interface configured to receive second presence information corresponding to a second user identifier of the first user indicating a presence state of said first user in a second domain of a second autonomous system; an aggregated presence information generation module configured to generate, from said first and second presence information, a first set of aggregated presence information; and a third interface configured to communicate said first set of aggregated presence information, in a first format, to a first presence server, as presence information corresponding to a third user identifier.

In some embodiments, the first presence server includes: a first communications interface configured to communicate, from said first presence server, said first set of aggregated presence information, in said first format, as presence information corresponding to the third user identifier, to a device, e.g., 3rd device which is an MS LYNC device, in a third domain of a third autonomous system.

In some embodiments, said PAIF device further comprises: an information processing module configured to process said first set of aggregated information to put it in said first format. In some embodiments, said first set of aggregated information in the first format includes an aggregation indicator indicating that the information being communicated is aggregated information.

In some embodiments, the first communication interface in said first presence server is further configured to receive third presence information corresponding to said third user identifier of the first user indicating a presence state of said first user on a third device in said third domain of said third autonomous system. In various embodiments, said first presence server further comprising: an updated information generation module configured to generate, from said first set of aggregated presence information and said third presence information from said third device, an updated first set of aggregated presence information in the first format; and the first communications interface is further configured to communicate said updated first set of aggregated presence information, in the first format, to a device (e.g., 3rd device or another device in 3rd domain) in said third domain.

In some embodiments, first set of aggregated presence information is generated by a presence aggregation internetworking function module included in said aggregation element. In various embodiments, the PAIF device is configured to interface between an IMS network and a MS Lync server. In some such embodiments, the PAIF device is positioned between the IMS network and the MS Lync Server. In some embodiments, the PAIF device is located in the IMS network. In various embodiments, the PAIF device is included in a border session controller which is an edge device positioned at the edge of the IMS network.

In some embodiments, the first presence server is an MS LYNC server, and wherein said third identifier is an MS Lync ID. In some such embodiments, said first set of aggregated presence information is not indicated to be aggregated information.

In various embodiments, the first and second user identifiers are not MS LYNC identifiers. In some such embodiments, the first, second and fourth user identifiers are not MS Lync identifiers; the third user identifier is an MS LYNC identifier, and the first second and fourth user identifier correspond to the same user.

In some embodiments, the PAIF device includes a fourth interface configured to receive fourth presence information corresponding to a fourth user identifier of the first user indicating a presence state of said first user in a fourth domain of a fourth autonomous system. In some such embodiments, said aggregated presence information generation module is further configured to generate from said first, second and fourth presence information an updated first set of aggregated presence information; and the third interface is further configured to communicate said updated first set of aggregated presence information, in the first format, to the first presence server, as presence information corresponding to the third user identifier.

In some embodiments, the first presence information corresponds to a first device, the second presence information corresponds to a second device and said fourth presence information corresponds to a fourth device, said first, second and fourth devices corresponding to the first user. In some such embodiments, the first presence server further comprises: a first updating module which is configured to control the first presence server to communicate, via said first communications interface, said updated first set of aggregated presence information, in said first format, as presence information corresponding to the third user identifier, to at least one device which supports said first format and has expressed an interest (e.g., registered for presence updates corresponding to the first MSLYNC ID or request presence information for the first MS LYNC ID) in presence information corresponding to the third user identifier. In some such embodiments, said first presence server further comprises: a format conversion module configured to convert said updated first set of aggregated presence information from said first format to a different format used by a device which does not support said first format but which has expressed an interest in presence information corresponding to the third user identifier; and a second updating module which is configured to control the first presence server to communicate, via a second communications interface, said updated first set of aggregated presence information to the device which does not support said first format.

In some embodiments, the third presence information includes user state information in an MS Lync format, said first, second and fourth domains being domains in which MS Lync is not used to communicate presence information.

In various embodiments, said first presence information is presence information generated by a Web server and wherein said first presence information corresponds to a smart phone. In some embodiments, said first presence information includes user state information in a XML (eXtensible Markup Language) format, said first domain being a domain in which XML is used to communicate presence information. In some such embodiments, the XML format is XMPP (Extensible Messaging and Presence Protocol) format. In some embodiments, said second user identifier is an IMS ID; and the second presence information is information obtained from SIP signaling corresponding to devices using said IMS ID or location signaling corresponding to devices using said IMS ID.

In some embodiments, the system further includes a home subscriber server including memory for storing said first set of aggregate presence information corresponding to said IMS ID. In some embodiments, the second presence information includes SIP session information from a call server control entity, e.g., a S-CSCF.

In some embodiments, said first and second presence information each include one or more of the following: user registration status; user in call status or IDLE status; user location; access network capability information; and user device capability information, e.g., device audio and/or video capability information.

In some embodiments, the updated aggregated presence information is transmitted from the PAIF device to the first presence server when the updated aggregated presence information associated with the first user generated by the PAIF device is determined by the PAIF device to be different from the prior aggregated presence information generated by the PAIF device for the first user and the updated presence information associated with the first user is not transmitted from the PAIF device to the first presence server when the PAIF device determines that the updated aggregated presence information generated by the PAIF device is not different from the prior aggregated presence information generated by the PAIF device for the first user and previously transmitted to the first presence server. In some embodiments, the first presence server publishes aggregated user presence information only when the first presence server determines that the aggregated user presence information has changed.

In some embodiments the first and second devices may be in the same autonomous system but in different domains. The various user devices shown and described in the exemplary embodiments such as smartphones, desk phones, IMS based mobile cellphones, and PBX desk phones, are only exemplary in nature and are not meant to limit the application.

In some embodiments, device 1 118 may register with Google Presence Server 106 to receive notifications of the presence status of the third user identifier. In some such embodiments, the Google Presence Server 106 registers with the MS Lync Presence Server 102 to receive notifications regarding the status of the presence information associated with the third user identifier and upon receipt of such information from the MS Lync Presence Server 102 via XMPP Gateway 104 over communication links 140 and 142 transmits the information to the device 1 118 via communication link 145.

In various embodiments the system includes a call server including: a CTI interface for monitoring call activity corresponding to said fourth user identifier; and a generation module for generating said fourth presence information based on said monitoring.

Figure 14:
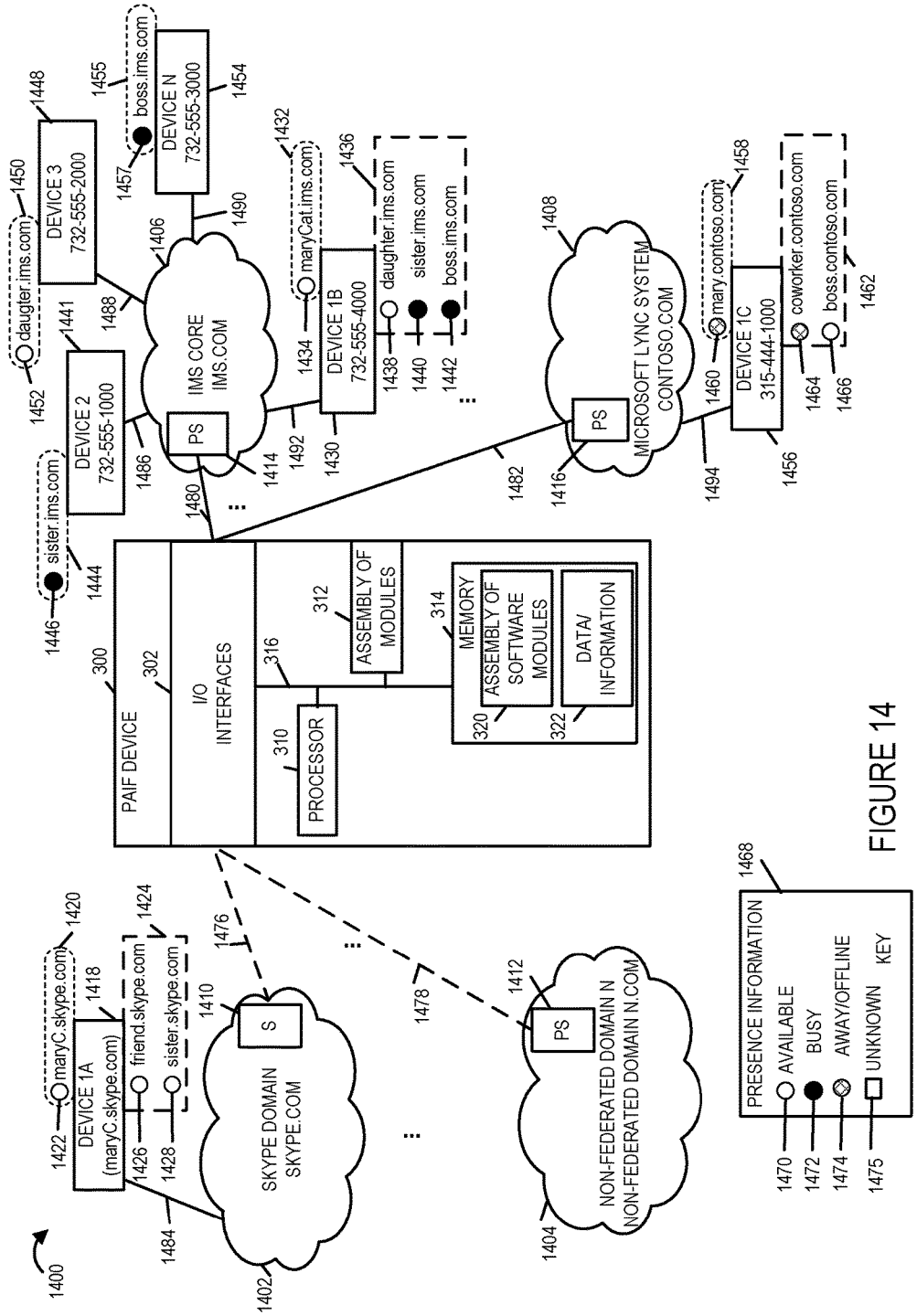
FIG. 14 illustrates an exemplary communications environment for aggregating contact information in accordance with one embodiment of the present invention.

FIG. 14 illustrates an exemplary communications environment 1400 for aggregating contact information including presence information in accordance with another embodiment of the present invention in which various features and aspects will now be described. Elements with the same numbers are the same or similar to those already described to one or more of the previous figures and will not be described in detail again. The exemplary communications environment 1400 includes, among other things, a plurality of federated and non-federated systems and domains coupled to each other via PAIF device 300 for processing data. The data being processed may be, and in various embodiments is, user contact information including user presence information from a variety of different systems, networks and/or domains. In some embodiments the exemplary communications environment 1400 is implemented to obtain and aggregate a user's contact list information from a plurality of federated and non-federated systems, networks and/or domains and then distribute the aggregated contact list to one or more of the federated and non-federated systems, networks, and/or domains. In some embodiments the contact lists include presence information for one or more of the users on the contact list. In some embodiments, the presence information for the one or more users on the contact list is requested and received from contact servers in the federated and non-federated systems, networks, and/or domains and is aggregated by the PAIF device 300.

The non-federated networks and domains of the communications environment 1400 include Skype network 1402 having a Skype Domain skype.com, . . . , non-federated network N 1404 having non-federated domain N.com. The federated networks and domains of the communication environment 1400 includes IMS Core network 1406 having domain IMS.com, . . . , Microsoft Lync System network 1408 having domain contoso.com. The non-federated networks and associated domains, Skype network, 1402, . . . , non-federated network N 1404 are coupled to the PAIF device 300 via communication links 1476, . . . , 1478, respectively. The dashed communications links 1476, . . . , 1478 indicate that these networks are non-federated. The federated networks and associated domains, IMS Core Network 1406, . . . , Microsoft Lync System Network 1408 are coupled to the PAIF device 300 via communications links 1480, . . . , 1482 respectively. The solid communications links 1480, . . . , 1482 indicate that these networks are federated. The federated and non-federated networks have a relationship through the PAIF device 300. The federated networks and domains (Microsoft Lync System network (contoso.com domain), . . . , IMS Core Network (IMS.com domain) have a federated (secure, tightly coupled) relationship that supports presence setting, subscriber notifications, and session establishment between each other. The Skype network (skype.com domain), . . . , non-federated network N (non-federated domain N.com) are non-federated or loosely coupled networks and domains where the PAIF device 300 has a domain interface but is limited to session establish and intra-domain operations. The federated and non-federated networks include servers, e.g., non-federated Skype network 1402 includes a server 1410, non-federated network N 1404 includes a presence server 1412, IMS Core network 1406 includes presence server 1414, and Microsoft Lync system network 1408 includes presence server 1416. In some embodiments the presence servers incorporate contact servers or address book servers. In some embodiments the servers include memories for storing information such as user contact lists and user presence information and for storing programming instructions along with a processor for executing the programming instructions.

Communication link 1484 couples device 1A 1418 to Skype network 1402 and Skype server 1410. Communication links 1486, 1488, 1490, and 1492 couple device 2 1441, device 3 1448, device N 1454, and device 1B 1430 to IMS core network 1406 and presence server 1414. Communication link 1494 couples device 1C 1456 to Microsoft Lync system network 1408 and presence server 1416.

The exemplary user Mary is a subscriber to the Microsoft Lync System network 1408, the IMS Core network 1406 and Skype network 1402. In the Microsoft Lync system network contoso.com domain, Mary has the identity mary@contoso.com. Mary has different identities in the Skype network domain and the IMS core network domain. User Mary has an identity on the Skype network (maryC.skype.com) and the IMS Core network ims.com domain (maryCAT.ims.com). The identities in each domain have different sets of contacts and as shown in diagram 1400 the presence in each network reflects the state of the subscribers only in the respective network as this diagram 1400 depicts the initial state of the various systems, networks, and/or domains prior to aggregation and distribution of the contact list and associated presence information.

User Mary's contact list in the Skype domain includes two users. One with user identity friend.skype.com and a second user with the user identity sister.skype.com as shown in display box 1424. User Mary's contact list in the IMS core network IMS.com domain includes three users with user identities daughter.ims.com, sister.ims.com and boss.ims.com respectively as shown in display box 1436 of device 1B 1430. User Mary's contact list in the Microsoft Lync System network 1408 includes two users with user identities coworker.contoso.com and boss.contoso.com respectively as shown in the display box 1462 of device 1C 1456.

Box 1468 is a legend or key depicting the presence information status of a user, such as subscriber mary@contoso.com. Unfilled circle 1470 is the symbol depicting a user's presence information status as available. Completely filled circle 1472 is the symbol depicting a user's status as busy. Hatch filled circle 1474 is the symbol depicting a user's status as away/offline. Unfilled square 1475 is the symbol depicting a user's status as unknown, e.g., this symbol is used when a user's contact information obtained from a network is known but the presence information associated with the user is not available. This typically occurs when loosely coupled systems, networks, or domains do not provide real time presence information. In some embodiments, a user's presence information associated with a user ID is not available because the user has requested that the presence information associated with the user ID not be published.

The Skype Network 1402 includes a server 1410 which may be, and in some embodiments, is an application server which is coupled to the PAIF device 300 via communications link 1476. The Skype server 1410 includes one or more I/O interfaces for communicating with the PAIF device 300 and for communicating with other devices in the Skype network such as for example device 1A 1418. The I/O devices of the Skype server 1410 include transmitters and receivers for use in transmitting and receiving information such as for example messages. In some embodiments, the Skype server 1410 is a contact server and/or an address book server which includes one or more Skype users contact lists, e.g., e-mail list, buddy list, and associated presence information for users on the contact lists.

Device 1A 1418 is an exemplary device such as for example a PC or smartphone which corresponds to user Mary and which interfaces to the Skype network and the skype domain skype.com. The user Mary's identity in the skype domain is maryC.skype.com. Ellipse 1420 shows a display on the device 1A 1418 showing the status of maryC.skype.com. Unfilled circle 1422 indicates that user Mary with user identity maryC.skype.com is on line and available in the Skype network domain skype.com. Box 1424 is a display on the device 1A 1418 showing user maryC.skype.com's contacts, i.e., the user identities of users in maryC.skype.com Skype contact list, and presence information associated with each user identity in the contact list. Unfilled circle 1426 depicts that the user associated with user identity friend.skype.com is available. Unfilled circle 1428 depicts that the user associated with user identity sister.skype.com is also available.

User Mary's identity in the IMS Core network IMS.com domain is maryCat.ims.com. Device 1B 1430 is a user device, for example, a mobile IMS device, e.g., IMS phone corresponding to user Mary with a corresponding telephone number of 732-555-4000 and a corresponding user identity of maryCat.ims.com. Ellipse 1432 is a display on the device 1B 1430 that depicts presence information for user Mary with user identity maryCat.ims.com. The unfilled circle 1434 depicts that user Mary with user ID maryCat.ims.com is available in the ims.com domain. Box 1436 is a display on the device 1B 1430 showing user maryCat.ims.com contacts, i.e., the user identities of users in maryCat.ims.com IMS core network IMS.domain contact list, and presence information associated with each user identity in the contact list. Unfilled circle 1438 depicts that the user associated with user identity daughter.ims.com is available in the IMS.com domain. Filled circle 1440 depicts that the user associated with user identity sister.ims.com is busy in the ims.com domain. Filled circle 1442 depicts that the user associated with user identity boss.ims.com is busy in the IMS.com domain.

User Mary's identity in the Microsoft Lync System network with domain contoso.com is mary.contoso.com. Device 1C 1456 is a user device, for example, a desk phone corresponding to user Mary with a corresponding telephone number of 315-444-1000 and a corresponding user identity of mary.contoso.com. Ellipse 1458 is a display on the device 1C 1456 that depicts presence information for user Mary with user identity mary.contoso.com. The hatch filled circle 1460 depicts that user Mary with user ID mary.contoso.com is away/offline in the contoso.com domain. Box 1462 is a display on the device 1C 1462 showing user Mary contacts, i.e., the user identities of users in mary.contoso.com Microsoft Lync System network contact list, and presence information associated with each user identity in the contact list. Hatch filled circle 1464 depicts that the user associated with user identity coworker.contoso.com is away/offline in the contoso.com domain. Unfilled circle 1466 depicts that the user associated with user identity boss.contoso.com is available in the contoso.com domain.

Device 2 1441 is being operated in IMS core network within the ims.com domain. Device 2 1441, e.g., a mobile IMS phone, corresponding to user sister with telephone number 732-555-1000 and corresponding user identity sister.ims.com. Ellipse 1444 is a display on the device 2 1441 that depicts presence information for user sister with user identity sister.ims.com in the ims.com network. The filled circle 1446 depicts that user sister with user ID sister.ims.com is busy in the ims.com domain. While not shown for purposes of simplicity user sister may have, and in some embodiments does have, a contact list of user's associated with her ims.com identity similar to the contact list of user Mary.

Device 3 1448 is being operated in IMS core network within the ims.com domain. Device 3 1448, e.g., a mobile IMS phone, corresponding to user daughter with telephone number 732-555-2000 and corresponding user identity daughter.ims.com. Ellipse 1450 is a display on the device 3 1448 that depicts presence information for user daughter with user identity daughter.ims.com in the ims.com network. The unfilled circle 1452 depicts that user daughter with user ID daughter.ims.com is available in the ims.com domain.

Device N 1454 is being operated in IMS core network within the ims.com domain. Device N 1454, e.g., a mobile IMS phone, corresponding to user boss with telephone number 732-555-3000 and corresponding user identity boss.ims.com. Ellipse 1455 is a display on the device N 1454 that depicts presence information for user boss with user identity boss.ims.com in the ims.com network. The filled circle 1457 depicts that user boss with user ID boss.ims.com is busy in the ims.com domain.

While not shown for purposes of simplicity each user with a user identity in each of the systems, networks and/or domains of environment 1400 may have, and in some embodiments does have, a contact list associated with each of their user identities similar to the contact list described for user Mary.

In an exemplary method in accordance with one embodiment of the present invention, the process to acquire and distribute contacts includes the following steps: (1) subscriber/user identification is made available to the PAIF device 300 with the alias names/user identities in each system, network, and/or domain, (2) PAIF 300 requests and receives and/or retrieves the contact list for one or more users from each system, network, and/or domain, (3) the received and/or retrieved contacts on the contact lists are examined/processed to determine reachability, and (4) the PAIF 300 distributes contacts to the subscriber/user in the respective system, network, and/or domain with an appropriate session establishment contact.

Figure 15:
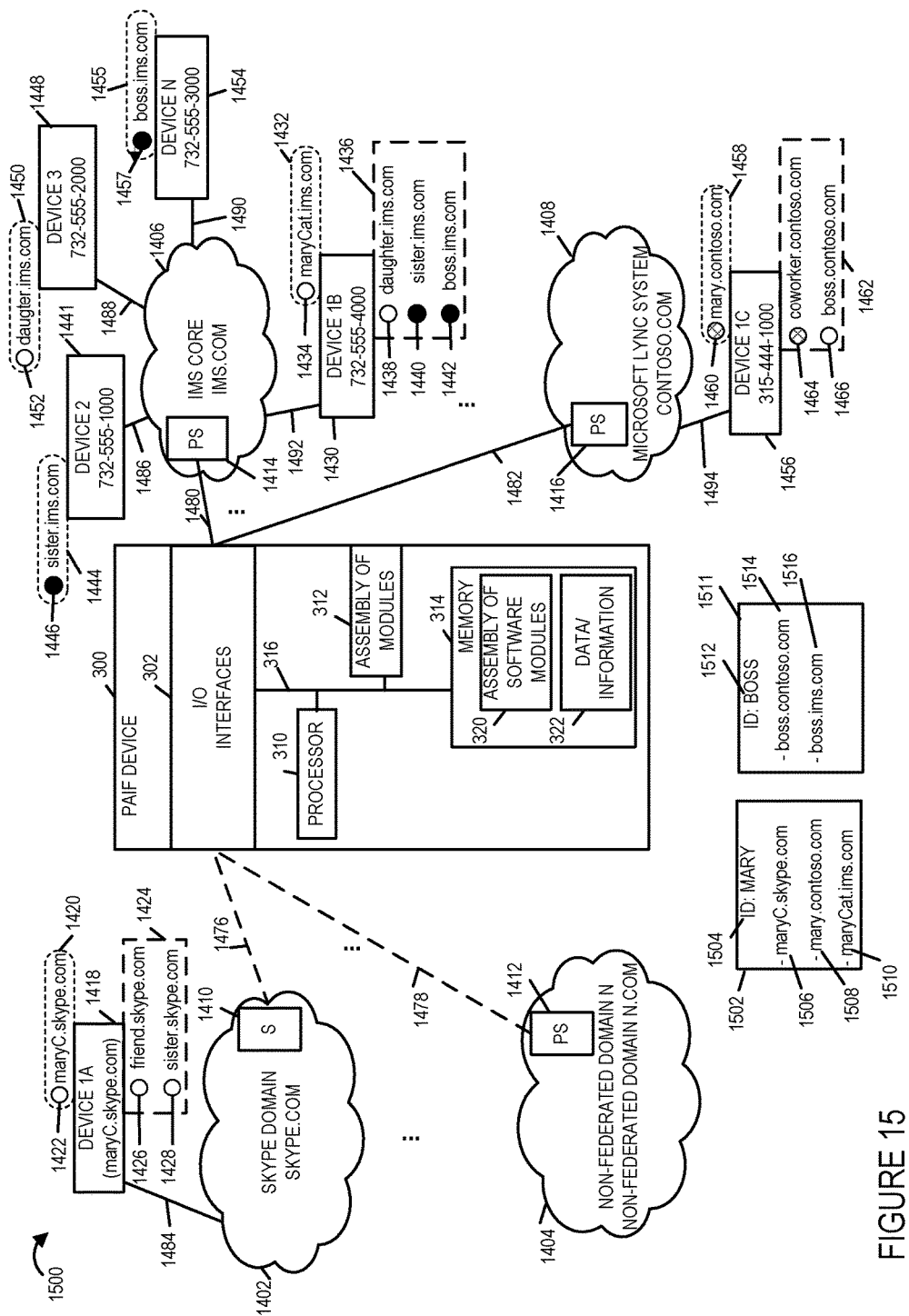
FIG. 15 illustrates the exemplary communications environment of FIG. 14 at a different point in time.

Diagram 1500 of FIG. 15 depicts communications environment 1400 at a different point in time. Elements with the same number are the same as or similar to the elements with the corresponding number in FIG. 14 and therefore will not be explained in detail in connection with diagram 1500.

Box 1502 depicts exemplary information contained in data/information section 322 of memory 314 of PAIF device 300 that associates a global universal ID for user Mary with the various aliases and/or user identities the user Mary has in the different systems, networks and/or domains coupled to the PAIF device 300. The global universal identifier or PAIF device identifier 1504 for user Mary is depicted as MARY. The identifiers associated with PAIF ID: MARY are: maryC.skype.com 1506 for the Skype network 1410 with domain Skype.com, mary.contoso.com 1508 for the Microsoft Lync System network 1408 with contoso.com domain and maryCat.ims.com 1510 for IMS Core Network 1406 with ims.com domain.

Box 1511 depicts exemplary information contained in data/information section 322 of memory 314 of PAIF device 300 that associates a global universal ID for user boss with the various aliases and/or user identities that user boss has in the different systems, networks and/or domains coupled to the PAIF device 300. The global universal identifier or PAIF device identifier 1512 for user boss is depicted as BOSS. The identifiers associated with PAIF ID: BOSS are boss.contoso.com 1514 for the Microsoft Lync System network 1408 with contoso.com domain and boss.ims.com 1516 for IMS Core Network 1406 with ims.com domain.

Though not shown in diagram 1500, also contained in data/information section 322 of memory 314 of PAIF device 300 is information that associates each user with a global user ID. Table 1900 of FIG. 19 shows the exemplary entries contained in a table stored in memory 314 of PAIF device 300 which also includes information for users sister, friend, daughter and co-worker in addition to information for users Mary and boss.

Figure 19:
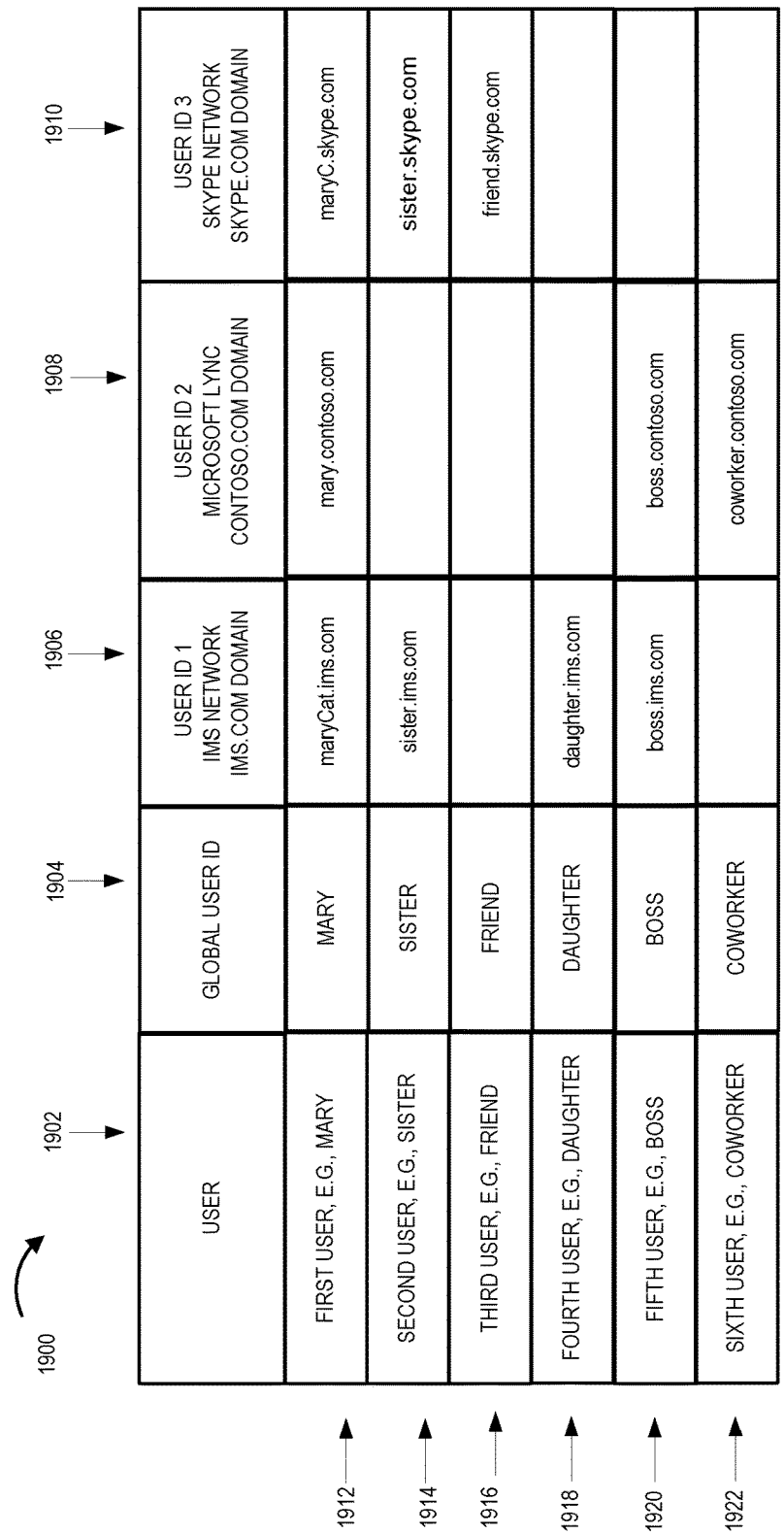
FIG. 19 illustrates an exemplary table 1900 which correlates users with user IDs.

FIG. 19 provides an exemplary table 1900 generated during initiation corresponding to the users shown in FIG. 14 which may be, and in some embodiments is stored in PAIF memory 322. Each of the entries in rows 1912, 1914, 1916, 1918, 1920, and 1922 contains information associating the user identified in the entries of column 1902 with its various user IDs or aliases wherein the user's assigned Global User Identifier or PAIF ID is contained in the entries in column 1904, the user's user ID 1 which is the user's IMS Network ims.com domain user ID is contained in the entries of column 1906, the user's user ID 2 which is the user's Microsoft Lync system network contoso.com domain user ID is contained in the entries of column 1908 and the user's user ID 3 which is the user's Skype Network skype.com domain user ID is contained in the entries s of column 1910. For example, the first user, e.g., Mary (entry column 1902, row 1912) is associated with Global User ID MARY, (entry column 1904, row 1912), user ID 1 which is IMS network ims.com domain user ID maryCat.ims.com (entry column 1906, row 1912), user ID 2 which is Microsoft Lync contoso.com domain user ID mary.contoso.com (entry column 1908, row 1912), and user ID 3 which is a Skype Network skype.com domain user ID maryC.skype.com (entry column 1910, row 1912). The user IDs in table 1900, e.g., MARY, maryCat.ims.com, mary.contoso.com and maryC.skype.com, are merely exemplary and are for illustrative purposes.

Row 1914 of table 1900 associates the second user, e.g., sister (entry column 1902, row 1914) with Global User ID SISTER (entry column 1904, row 1914), IMS Network ims.com domain user ID sister.ims.com (entry column 1906, row 1914), and Skype Network skype.com domain ID sister.skype.com (entry column 1910, row 1914). The second user sister does not have a Microsoft Lync ID contoso.com domain user ID and therefore the table entry for column 1908, row 1914 is empty.

The entries in row 1916 of table 1900 associates the third user, e.g., friend (entry column 1902, row 1916) with Global user ID FRIEND (entry column 1904, row 1916) and Skype Network skype.com domain user ID friend.skype.com (entry column 1910, row 1916. The third user friend does not a IMS network ims.com domain user ID so the entry in column 1906, row 1916 is blank. Similarly, the third user friend does not have a Microsoft Lync contoso.com domain user ID and therefore the entry in column 1908, row 1916 is blank.

Row 1918 of table 1900 associates the fourth user, e.g., daughter (entry column 1902, row 1918) with Global user ID DAUGHTER (entry column 1904, row 1918) and IMS Network ims.com domain user ID daughter.ims.com (entry column 1906, row 1918). The fourth user daughter does not have a Microsoft Lync contoso.com domain user ID and therefore entry column 1908, row 1918 is blank. Similarly, fourth user daughter does not have a Skype Network skype.com domain user ID and so the entry for column 1910, row 1918 is blank.

Row 1920 of table 1900 associates the fifth user, e.g., boss (entry column 1902, row 1920) with Global user ID BOSS (entry column 1904, row 1920), with IMS Network ims.com domain user ID boss.ims.com (entry column 1906, row 1920), and with Microsoft Lync contoso.com domain user ID boss.contoso.com. The fifth user boss does not have a Skype Network skype.com domain user ID and so the entry for column 1910, row 1920 is blank.

Row 1922 of table 1900 associates the sixth user, e.g., coworker (entry column 1902, row 1922) with Global user ID COWORKER (entry column 1904, row 1922) and with Microsoft Lync contoso.com domain user ID coworker.contoso.com. The sixth user coworker does not have IMS Network ims.com domain user ID so the entry for column 1906, row 1922 is blank. Similarly, the sixth user coworker does not have a Skype Network skype.com domain user ID and so the entry for column 1910, row 1922 is blank.

The information contained in table 1900 may be, and in some embodiments is, inputted by an administrator during initialization and/or when the PAIF is notified that a new subscriber/user has been added to one or more of the systems, networks, and/or domains coupled to the PAIF 300 device. Additionally, in some embodiments the information in table 1900 will be updated on a periodic basis to reflect additional user identities associated with a user since the last update of the table or user identifiers that should be deleted because they are no longer associated with a user since the last update of the table. In some embodiments, when a subscriber registers or is assigned a user identity by a system, network and/or domain coupled to the PAIF 300 device a message is automatically sent to the PAIF device from the system, network and/or domain with a request to update the PAIF device 300 list of user(s) and associated user identities. In some embodiments the request message will include information to identify the system, network and/or domain, the user and associated user identity.

While in the exemplary embodiment, a global identifier or PAIF identity has been shown to associate the various user identities, this is only a matter of design choice as there are a variety of ways known to those of skill in the art to associate various identities without the use of a global identifier. For example, a linked list of records could be generated wherein each record contains one or more user identity fields for storing all known user identities that associated with a user without using a global identifier. The use of a global identity or PAIF ID however does provide advantages over some of the other known methods such as in certain PAIF systems it facilitates a fast look up when determining associated identities and the global or PAIF identifier is already known.

After a list of identities associated with a user is generated, the PAIF 300 requests and receives and/or retrieves the contact list associated with the user from each system, network, and/or domain for which the user has an identity. For example in one embodiment, for user Mary, a request message, e.g., get Contacts (maryC.skype.com) is transmitted over communication link 1476 from the PAIF device 300 I/O Interfaces 302 to the Skype network server 1410 which includes a contact list for user maryC.skype.com. The Skype server in response to the request message returns to the PAIF device 300 one or messages containing the list of contacts user Mary has in the Skype network, i.e., friend.skype.com and sister.skype.com and in some embodiments the presence information associated with each of the user identities on the contact list. The processor 310 of PAIF device 300 upon receipt of this contact and associated presence information stores the received information in the PAIF device memory 314 data/information section 322.

PAIF device 300 similarly transmits contact list requests to each of the systems, networks and/or domains for each of the additional user identities associated with user Mary. In the present example, a contact list request message, e.g., get Contacts (maryCat.ims.com), is transmitted to the presence server 1414 via I/O Interfaces 302 and communication link 1480 to a contact server contained in the presence server 1414 of the IMS core network 1406 in ims.com domain. In response to the to the request message the contact server contained in the presence server 1414 returns to the PAIF device 300 one or messages containing the list of contacts user Mary with user ID maryCat.ims.com has in the IMS network, i.e., daughter.ims.com, sister.ims.com and boss.ims.com and in some embodiments the presence information associated with each of the user identities on the contact list. The processor 310 of PAIF device 300 upon receipt of this contact and associated presence information stores the received information in the PAIF device memory 314 data/information section 322.

In the present example, a contact list request message, e.g., get Contacts (mary.contoso.com), is transmitted to the presence server 1416 via I/O Interfaces 302 and communication link 1482 to a contact server contained in the presence server 1416 of the Microsoft Lync System network 1408 in contoso.com domain. In response to the to the request message the contact server contained in the presence server 1416 returns to the PAIF device 300 one or messages containing the list of contacts user Mary with user ID mary.contoso.com has in the Microsoft Lync system network, i.e., coworker.contoso.com and boss.contoso.com. The processor 310 of PAIF device 300 upon receipt of this contact and associated presence information stores the received information in the PAIF device memory 314 data/information section 322.

In some embodiments the contact information for each user identity is retrieved by the PAIF device 300. In some embodiments, the PAIF device 300 registers with one or more presence server and/or contact server in each system, network, and/or domain coupled to the PAIF device to be notified of changes in the contact information and/or associated presence information associated with each user identifier being tracked by the PAIF device 300.

After the PAIF device 300 obtains the contacts associated with user Mary, it generates an aggregated contact list for each user and examines the contacts included in the list along with each contact's corresponding system, network, and/or domain to determine whether the system, network and/or domain is reachable. The PAIF device 300 stores the aggregated contact list and the reachability information in memory 314.

PAIF device 300 then distributes contacts to the subscriber/user in the respective domain with an appropriate session establishment contact (e.g., an actionable link that when clicked on sets up a session with the contact on the contact list). In the present example, the PAIF device 300 distributes the aggregated list of contacts with associated presence information for user Mary to each of the systems, networks, and/or domains for which user Mary has one or more associated user identifiers by transmitting one or messages to the corresponding systems, networks, and/or domains which includes the contact information and associated presence information. In some embodiments, the PAIF device 300, only transmits the contact information for the additional contacts which are not already known to the system, network and/or domain. For example, PAIF device 300 omits from transmitting contact information for daughter.ims.com, sister.ims.com, and boss.ims.com to the IMS network ims.com for user Mary but instead only sends contact information for coworker.contoso.com, friend.skype.com, and sister.skype.com. The information is transmitted to the presence server 1414 which includes a contact server.

Figure 16:
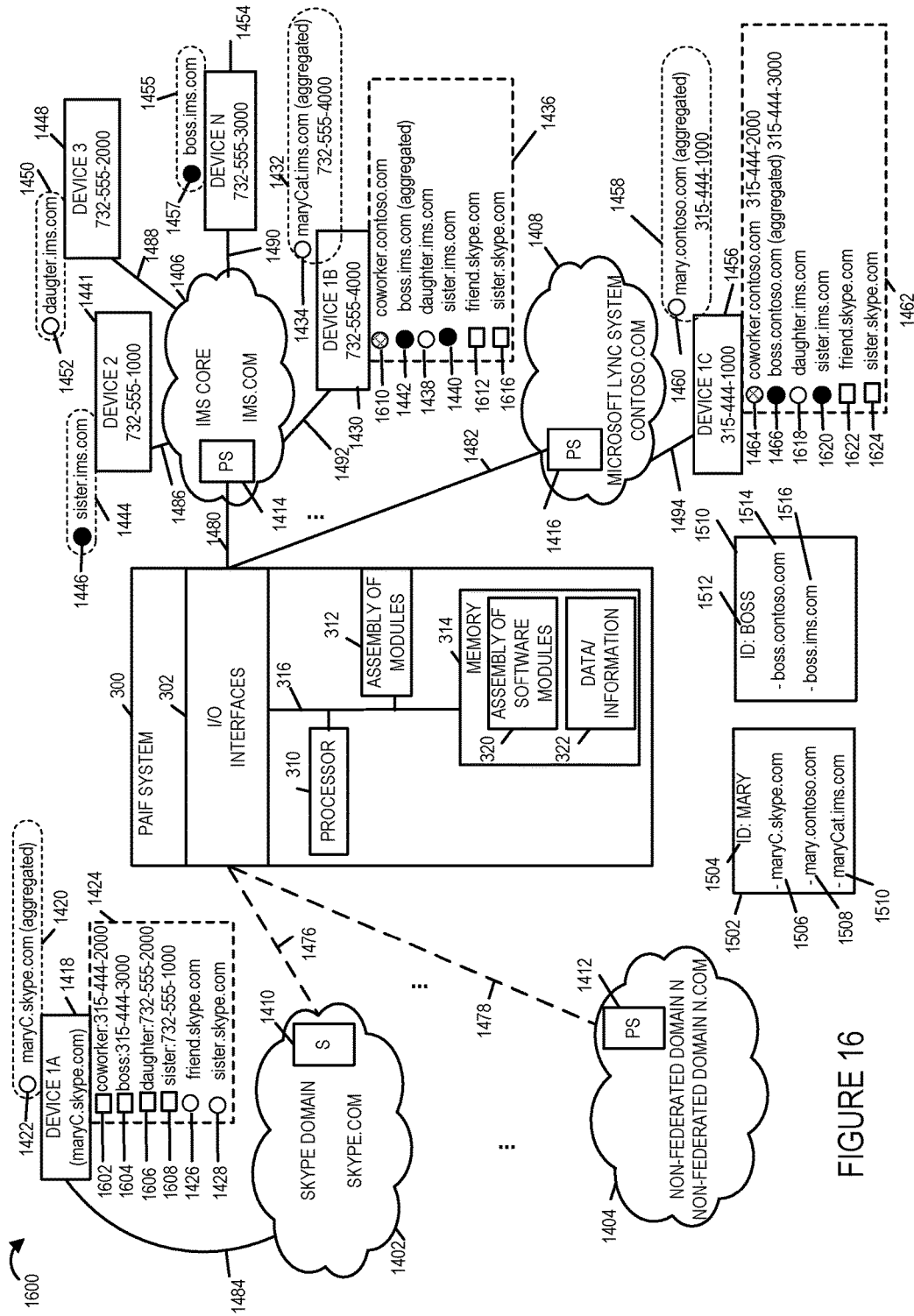
FIG. 16 illustrates the exemplary communications environment of FIGS. 14 and 15 at a different point in time.

Diagram 1600 of FIG. 16 illustrates the results of the contact distribution for user Mary. Diagram 1600 of FIG. 16 depicts communications environment 1400 at a different point in time from that shown in FIGS. 14 and 15. Elements with the same number are the same as or similar to the elements with the corresponding number in FIGS. 14 and 15 and therefore will not be explained in detail in connection with diagram 1600.

Diagram 1600 illustrates, among other things, that in this exemplary embodiment (1) tightly coupled systems, networks, and/or domains, e.g., federated systems, networks and/or domains will reflect real time presence information of the subscribers/users, (2) each system, network and/or domain maintains its own presence aggregation, the PAIF device 300 provides the presence status of the subscriber/user aliases/user IDs to each system, network and/or domain, (3) loosely coupled systems, networks, and/or domains, e.g., non-federated systems, networks, and/or domains, do not provide real time presence information, however the loosely coupled systems, networks, and/or domains consume presence information published for specific subscribers/users, and (4) the PAIF device 300 delivers a contact reachable from the destination system, network, and/or domain, for example, in diagram 1600 the contacts provided to the Skype network with domain Skype.com are PSTN (Public Switched Telephone) numbers as in this present example this is the only method to establish a session from the Skype domain.

As shown in diagram 1600 after the PAIF device 300 completes the contact aggregation and distribution processing steps of the exemplary method user Mary's contact list in the Skype Network skye.com domain, IMS Core Network ims.com domain and Microsoft Lync System Network contoso.com domain are now shown as aggregated contact lists.

Ellipse 1420 shows a display on the device 1A 1418 showing the status of maryC.skype.com that indicates it contains aggregated information. Unfilled circle 1422 indicates that user Mary with user identity maryC.skype.com is on line and available. Box 1424 is a display on the device 1A 1418 showing user maryC.skype.com's contacts which have now been updated to include the aggregated contact list which was distributed by the PAIF device 300, i.e., the user identities of users in maryC.skype.com Skype contact list which now includes contacts for coworker, boss, daughter and sister, friend.skype.com and sister.skype.com and presence information associated with each user identity in the contact list. Unfilled square 1602 indicates no real time presence information is available for the contact with user ID coworker who is contactable via telephone number 315-444-2000. Unfilled square 1604 indicates no real time presence information is available for the contact with user ID boss who is contactable via telephone number 315-444-3000. Unfilled square 1606 indicates no real time presence information is available for the contact with user ID daughter who is contactable via telephone number 732-555-2000. Unfilled square 1608 indicates no real time presence information is available for the contact with user ID sister who is contactable via telephone number 732-555-1000. Unfilled circle 1426 depicts that the user associated with user identity friend.skype.com is available. Unfilled circle 1428 depicts that the user associated with user identity sister.skype.com is also available.

In diagram 1600, ellipse 1432 is a display on the device 1B 1430 that depicts presence information for user Mary with user identity maryCat.ims.com. The display indicated that it contains aggregated information. The unfilled circle 1434 depicts that user Mary with user ID maryCat.ims.com is available.

In diagram 1600, box 1436 is a display on the device 1B 1430 showing user maryCat.ims.com contacts after aggregation, i.e., the user identities of users in maryCat.ims.com IMS core network IMS.domain contact list as they have been updated from the aggregated contact information distributed the PAIF 300 device, and presence information associated with each user identity in the contact list. The hatched filled circle 1610 associated with contact coworker.contoso.com indicates that the user with user Id coworker.contoso.com is away/offline. This real time presence information is available because the Microsoft Lync system network and IMS core network are federated tightly coupled systems. Contact boss.ims.com is indicated as being an aggregated contact listing, i.e., the presence and contact information for the user who shares user IDs boss.ims.com and boss.contoso.com have been aggregated. In this example, the boss's IMS user ID is being displayed along with an aggregated presence information status. The filled circle 1442 indicates that the user associated with user ID boss.ims.com is busy. Unfilled circle 1438 depicts that the user associated with user identity daughter.ims.com is available. Filled circle 1440 depicts that the user associated with user identity sister.ims.com is busy. Unfilled square 1612 depicts that the presence status of the user associated with user ID friend.skype.com is not known. Unfilled square 1616 depicts that the presence status of the user associated with user identity sister.skype.com is unknown.

In diagram 1600, ellipse 1458 is a display on the device 1C 1456 that depicts presence information for user Mary with user identity mary.contoso.com and that telephone phone number 315-444-1000 corresponds to the device and user ID. Furthermore, the display indicates that it contains aggregated information. The unfilled circle 1460 depicts that user Mary with user ID mary.contoso.com is available.

In diagram 1600, box 1462 is a display on the device 1C 1456 in the Microsoft Lync system 1408 showing user mary.contoso.com contacts after aggregation, i.e., the user identities of users on the mary.contoso.com contact list as they have been updated from the aggregated contact information distributed by the PAIF 300 device, and presence information associated with each user identity in the contact list. The hatched filled circle 1464 associated with contact coworker.contoso.com indicates that the user with user Id coworker.contoso.com is away/offline. Contact boss.contoso.com is indicated as being an aggregated contact listing, i.e., the presence and contact information for the user who shares user IDs boss.ims.com and boss.contoso.com have been aggregated. In this example, the boss' contoso.com user ID is being displayed along with an aggregated presence information status as the device 1C is present in the Microsoft Lync system network. The filled circle 1466 indicates that the user associated with user ID boss.contoso.com is busy. Unfilled circle 1618 depicts that the user associated with user identity daughter.ims.com is available. Filled circle 1620 depicts that the user associated with user identity sister.ims.com is busy. Unfilled square 1622 depicts that the presence status of the user associated with user ID friend.skype.com is not known. Unfilled square 1624 depicts that the presence status of the user associated with user identity sister.skype.com is unknown.

Presence information of available, busy, away/offline and unknown are only exemplary in nature and other presence information and status information may be, and in some embodiments, is also presented. For example, in some embodiments the presence information may include one or more of the following: user registration status, user in call status or IDLE status, user location, access network capability information, and user device capability information (e.g., device audio and/or video capability information). As one of ordinary skill in the art will appreciate the various methods previously described for obtaining and aggregating presence information for a user are applicable to this exemplary embodiment which distributes aggregated contact information and associated presence information.

The PAIF device may be, and in some embodiments is a standalone device. In some embodiments the PAIF device is incorporated into an Session Border Controller device. The PAIF functionality may be, and in some embodiments is, integrated into an application server device, call server device, IP PBX or session core controller device.

Figure 17:
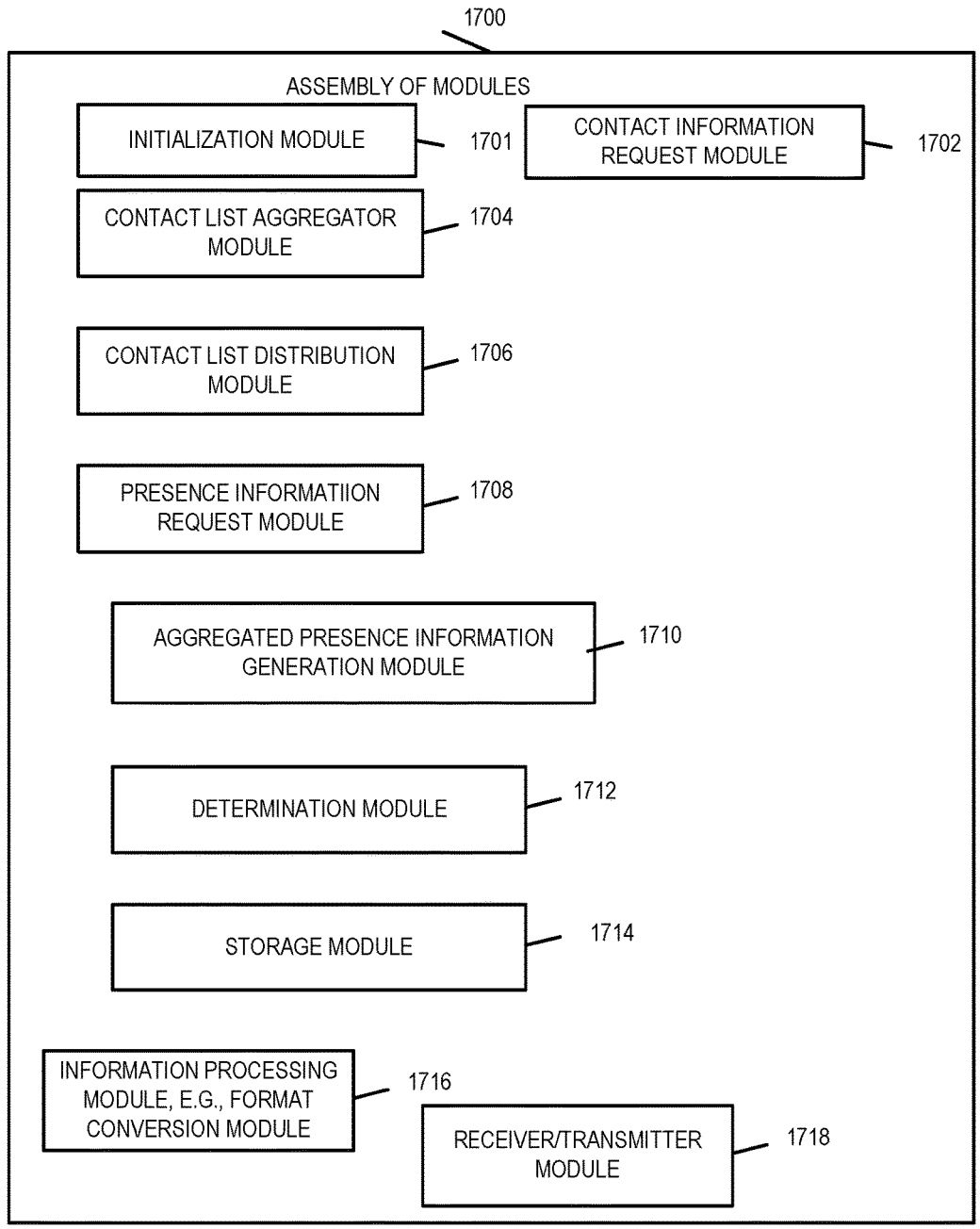
FIG. 17 illustrates an exemplary assembly of modules which may be included in a PAIF device in accordance with an exemplary embodiment.
Figure 18B:
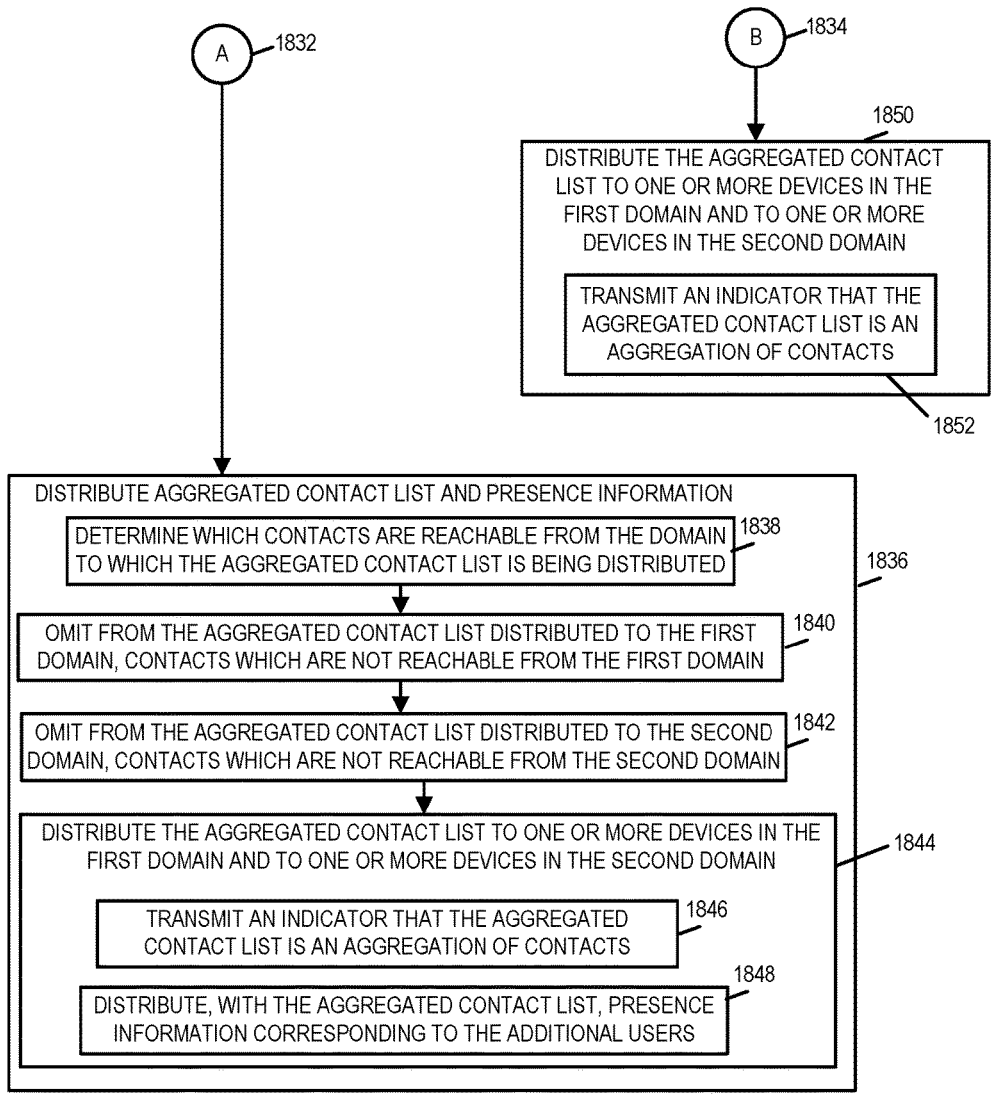
FIG. 18B is a second part of a flowchart of an exemplary method of providing aggregated contact information in a communications environment in accordance with an exemplary embodiment.

FIG. 18, comprising the combination of FIG. 18A and FIG. 18B, is a flowchart 1800 of an exemplary method of providing the distribution of contact information including presence information in a communications environment including multiple federated and non-federated networks and/or domains, e.g., communications environment 1400 of FIG. 14, in accordance with an exemplary embodiment. The exemplary method of flowchart 1800 will now be explained in connection with the communications environment 1400 of FIG. 14 and the PAIF assembly of modules 1700 illustrated in FIG. 17. The processing steps of method 1800 described may be, and in some embodiments are, performed by processor 310 of PAIF device 300. In some embodiments various processing steps are performed by PAIF device module and/or PAIF device I/O interface circuits such as for example, contact list distribution module 1706.

Operation of the method commences in start step 1802 when operating a presence aggregation interworking (PAIF) device begins. Processing proceeds from start step 1802 to initialization step 1804, in which the system is initialized. During initialization step 1802, the user identities corresponding to each user are stored in memory, for example, for a first user, a first set of user identifiers corresponding to a first user are stored in memory accessible to the PAIF device, e.g., PAIF memory 314 data/information section 322, as corresponding to the first user. This first set of user identifiers for the first user including a first user identifier corresponding to a first domain and a second user identifier corresponding to a second domain. The stored user identities are then available for later use in the process for example during the aggregation of presence information for a user based on the user IDs associated with the user. As described above, FIG. 19 provides an exemplary table 1900 generated during the initiation step corresponding to the users shown in FIG. 14 which may be, and in some embodiments are, stored in section 322 data/information of PAIF memory 314.

Operation proceeds from initialization step 1804 to steps 1806 and 1808.

In step 1806, a contact information request module requests, using the first user identifier, contacts (e.g., a buddy, email, phone or other contact list) associated in the first domain with the first user identifier. The first domain may be, for example, IMS.COM domain in the IMS Core network of the communications environment 1400 of FIG. 14. The first user identifier may be, for example, maryCat.ims.com from table 1900 wherein Mary is the first user. The request may be, and in some embodiments is, a request message sent from the PAIF device 300 to a contact server or address book server in the IMS core network. In some embodiments, the contact server is incorporated into the presence server, e.g., presence server 1414 of diagram 1400. Operation proceeds from step 1806 to step 1810. In step 1810 the PAIF device 300 receives a first contact list from the first domain. For example, in connection with FIG. 14 the mary.ims.com user ID is associated with the following contacts that would be received by the PAIF device 300 from the contact server in the IMS Network 1406: daughter.ims.com, sister.ims.com, boss.ims.com. Processing then proceeds from step 1810 to step 1812.

Returning to step 1808. In step 1808, a contact information request module requests, using the second user identifier, contacts (e.g., a buddy, email, phone or other contact list) associated in the second domain with the second user identifier. The second domain may be, for example, the contoso.com domain in the Microsoft Lync System network 1458 of the communications environment 1400 of FIG. 14. The second user identifier may be, for example, mary.contoso.com from table 1900 wherein Mary is the first user. The request may be, and in some embodiments is, a request message sent from the PAIF device 300 to a contact server or address book server in the Microsoft Lync system network. In some embodiments, the contact server is incorporated into the presence server, e.g., presence server 1416 of diagram 1400. Operation proceeds from step 1808 to step 1814. In step 1814 the PAIF device 300 receives a second contact list from the second domain. For example, in connection with FIG. 14 the mary.contoso.com user ID is associated with the following contacts that would be received by the PAIF device 300 from the contact server in the Microsoft Lync System network 1408: coworker.contoso.com and boss.contoso.com. Processing then proceeds from step 1814 to step 1812.

After receiving the contact lists in steps 1810 and 1814, the PAIF storage module 1714 will store the received contacts lists in PAIF memory 314 data/information section 322 associated with their respective user IDs and the user Mary so that the information is available for later use such as during the aggregation of the received contact information.

In step 1812, the PAIF device contact list aggregator module 1704 generates an aggregated contact list corresponding to the first user from the first contact list received from the first domain and from the second contact list received from the second domain. The aggregated contact list for the first user may, and in some embodiments is, stored in PAIF device memory 314 section 322 data/information and associated with the first user by the PAIF storage module.

Operation proceeds from step 1812 to decision step 1818. In decision step 1818 processor 310 determines if the aggregated contact list generated in step 1812 includes user identifiers corresponding to users other than the first user. In some embodiments a PAIF decision module is used to make this determination. If it is determined that the aggregated contact list does not include user identifiers corresponding to users other than the first user then processing proceeds to step 1850 via connection node 1834. If it is determined that the aggregated contact list does include user identities corresponding to users other than the first user processing proceeds from decision step 1818 to step 1820.

In step 1820 processor 310 identifies the user identifiers corresponding to a user other than the first user in the aggregated contact list. Processing then proceeds to step 1822. In step 1822, processor 310 identifies each additional user different from the first user based on the user identifiers identified as corresponding to users other than the first user. Processing then proceeds to do loop consisting of processing steps 1824, 1826, 1828, and 1830 wherein for each identified additional user 1 to N wherein N is the number of additional users identified processing steps 1824, 1826, 1828 and 1830 are performed. In step 1824, PAIF processor 310 retrieves from the PAIF memory 314 data/information section 310 the user identifiers associated with the additional user. Processing then proceeds to step 1826 of the do loop. In step 1826, the PAIF device 300 requests presence information, for each user identifier associated with said identified additional user, from a domain corresponding to said each user identifier. For example, presence information for user ID boss.ims.com would be requested from the presence server 1414 in the IMS core network 1406 and presence information for user ID boss.contoso.com would be requested from the presence server 1416 in the Microsoft Lync System with domain contoso.com. Processing proceeds from step 1826 to step 1828. In processing step 1828, the PAIF device 310 receives presence information for each user identifier associated with said additional user. For example, presence server 1416 transmits presence information for user ID boss.contoso.com to PAIF device 300 and presence server 1414 transmits presence information for user ID boss.ims.com to PAIF device 300. In some embodiments, the processor 310 of the PAIF device 300 receives the transmitted via I/O Interfaces 302 and the storage module processes the received presence information and stores it in PAIF memory 314 section 322. Operation proceeds from step 1828 to presence aggregation step 1830. In step 1830 PAIF aggregation presence information generation module aggregates the presence information received in response to the requests for presence information corresponding to each user identifier associated with said identified additional user therein generating an aggregated presence information for the additional user. If there are additional users processing proceeds to step 1824 and the next additional user is processed in the do loop. Once all additional users N have been processed in the do loop processing proceeds from step 1830 to step distribution step 1836 via connection node A 1832.

In distribution step 1836 the contact list distribution module 1704 of PAIF device 300 distributes the aggregated contact list to one or more devices in the first domain and to one or more devices in the second domain. For example, the aggregated contact list for user Mary and associated presence information may be distributed to contact server and presence server of IMS core network 1406 and Microsoft Lync System 1408. In some embodiments, the contact list distribution step includes one or more of sub-steps 1838, 1840, 1842 and 1844.

In processing sub-step 1836 PAIF determination module 1712 determines which contacts are reachable from the domain to which the aggregated contact list is being distributed. In sub-step 1840, the processor 310 omits from the aggregated contact list distributed to the first domain, contacts which are not reachable from the first domain. In sub-step 1842, processor 310 omits from the aggregated contact list distributed to the second domain, contacts which are not reachable from the second domain. In sub-step 1844 PAIF device 300 contact list distribution module distributes, e.g., transmits using receiver/transmitter module 1718, the aggregated contact list to one or more devices in the first domain and to one or more devices in the second domain. In some embodiments, the sub-step 1848 includes a further processing step 1846 of transmitting an indicator that the aggregated contact list distributed is an aggregation of contacts. In some embodiments sub-step 1844 includes an additional processing step 1848 in which the contact distribution module 1712 distributes, with the aggregated contact list, presence information corresponding to the additional users.

While for the sake of simplicity in explaining the method of the invention disclosed in connection with flowchart 1800 the aggregation of contact lists for only two domains of communication environment 1400 were discussed, it should be appreciated that the method of aggregation and distribution described are applicable to more than two domains. For example, the exemplary method 1800 can be extended to multiple domains such as the skype.com domain in which user Mary also contains a user Id and has an associated contact list.

Returning to decision step 1818. As discussed previously, when it is determined in decision step 1818 that the aggregated contact list does not contain user identifiers corresponding to users other than the first user processing proceeds via connection node B 1834 to distribution step 1850. In distribution step 1850, the contact list distribution module 1706 distributes the aggregated contact list to one or more devices in the first domain and to one or more devices in the second domain. In some embodiments, the distribution step 1850 includes a sub-step 1852 wherein the contact distribution module 1706 transmits an indicator that the distributed aggregated contact list is an aggregation of contacts. In some embodiments, when it is determined in decision step 1818 that the aggregated contact list does not contain user identifiers corresponding to users other than the first user processing proceeds to distribution step 1836 wherein the aggregated contact list is distributed as previously described in connection with distribution step 1836.

An exemplary system in accordance with an embodiment of the present invention is now explained in connection with the assembly of modules 1700 of the drawing shown in FIG. 17.

FIG. 17 is a drawing of assembly of modules 1700 which may be, and in some embodiments is, included in exemplary PAIF device 300 illustrated in FIG. 14.

In some embodiments, the exemplary PAIF device 300 include the modules from the assembly of modules 400 shown in drawing 4 in addition to the modules shown in the assembly of modules 1700. The modules in the assembly of modules 1700 may, and in some embodiments are, implemented fully in hardware within the processor 310, e.g., as individual circuits. The modules in the assembly of modules 1700 may, and in some embodiments are, implemented fully in hardware within the assembly of modules 312, e.g., as individual circuits corresponding to the different modules. In other embodiments some of the modules are implemented, e.g., as circuits, within the processor 310 with other modules being implemented, e.g., as circuits within assembly of modules 312 and/or within I/O interfaces 302, external to and coupled to the processor 310. As should be appreciated the level of integration of modules on the processor and/or with some modules being external to the processor may be one of design choice.

Alternatively, rather than being implemented as circuits, all or some of the modules included in assembly of modules 1700 may be implemented in software and stored in the memory 314 of the PAIF device 300, with the modules controlling operation of PAIF device 300 to implement the functions corresponding to the modules when the modules are executed by a processor, e.g., processor 310. In some such embodiments, the assembly of modules 1700 is included in the memory 314 as assembly of modules 320. In still other embodiments, various modules in assembly of modules 1700 are implemented as a combination of hardware and software, e.g., with another circuit external to the processor providing input to the processor 310 which then under software control operates to perform a portion of a module's function. While shown in the FIG. 14 embodiment as a single processor, e.g., computer, it should be appreciated that the processor 310 may be implemented as one or more processors, e.g., computers.

When implemented in software the modules include code, which when executed by the processor 310, configure the processor 310 to implement the function corresponding to the module. In embodiments where the assembly of modules 1700 is stored in the memory 314, the memory 314 is a computer program product comprising a computer readable medium comprising code, e.g., individual code for each module, for causing at least one computer, e.g., processor 310, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 17 control and/or configure the PAIF device 300 or elements therein such as the processor 310, to perform functions of corresponding steps illustrated in the method flowchart 1800 of FIG. 18. Thus the assembly of modules 1700 includes various modules that perform functions of corresponding steps of the method shown in FIG. 18.

Assembly of modules 1700 includes an initialization module 1701, a contact information request module 1702, a contact list aggregator module 1704, a contact list distribution module 1706, a presence information request module 1708, an aggregated presence information generation module 1710, a determination module 1712, a storage module 1714, an information processing module 1716, a receiver/transmitter module 1718. The initialization module 1701 is configured to initialize the PAIF device including for example to store in memory 314 a first set of user identifiers corresponding to a first user (e.g. aliases corresponding to the first user), the first set of user identifiers including a first user identifier corresponding to a first domain and a second user identifier corresponding to a second domain.

Contact information request module 1702 is configured to request, using the first user identifier, contacts (e.g., a buddy, Email, phone or other contact list) associated in the first domain with the first user identifier. In some embodiments, the contact information request module 1702 generates and transmits a contact information request message using the receiver/transmitter module 1718 via the PAIF I/O interfaces 302 to a contact list server and/or address book server in the first domain. In some embodiments the contact list server and/or address book server is included in a first presence server located in and/or associated the first domain.

Contact information request module 1702 is further configured to request, using the second user identifier, contacts (e.g., a buddy, Email, phone or other contact list) associated in the second domain with the first user identifier. In some embodiments, the contact information request module 1702 generates and transmits a contact information request message using the receiver/transmitter module 1718 via the PAIF I/O interfaces 302 to a contact list server and/or address book server in the second domain. In some embodiments the contact list server and/or address book server is included in a second presence server located in and/or associated with the second domain.

The contact list aggregator module 1704 is configured to generate an aggregated contact list corresponding to said first user from a first contact list received from said first domain and from a second contact list received from said second domain. The first contact list may be, and in some embodiments is, received from the contact list server and/or address book server in the first domain or associated with the first domain via PAIF device 300 I/O Interfaces 302 and receiver/transmitter module 1718. The second list similar to the first contact list may be, and in some embodiments is, received from the contact list server and/or address book server in the second domain or associated with the second domain via PAIF device 300 I/O Interfaces 302 and receiver/transmitter module 1718. Storage module 1714 is configured to store a generated set of aggregated information and a processed set of generated aggregated information, e.g., within data/information 322 of memory 314 of PAIF device 300.

Information processing module 1718 is configured to process the received contact lists and perform any format conversions necessary for the PAIF device.

Storage module 1714 is configured to store the first and second contact lists received and the generated aggregated contact list, e.g., within data/information 322 of memory 314 of PAIF device 300.

The contact list distribution module 1706 is configured to distribute said aggregated contact list to one or more devices in the first domain and to one or more devices in the second domain, e.g., the one or more devices in said first domain include a first server. In some embodiments the first server is a first presence server. In some embodiments the first server is a first contact server. In some embodiments the first server is a contact server incorporated in a presence server. In some embodiments, the one or more devices includes a device such as a smart phone or computer operated by the first user.

The contact list distribution module 1706 in some embodiments is further configured to transmit an indicator that the aggregated contact list is an aggregation of contacts. For example, in some embodiments a bit or flag is set in a contact list distribution message indicating that the contents of the message includes an aggregation of contacts.

In some embodiments the aggregated contact list includes user identifiers corresponding to users other than the first user to which said first contact list corresponds, the aggregated contact list including a third user identifier corresponding to a second user who is different from said first user, and the presence aggregation interworking device 300 further includes a presence information request module 1708 configured to request presence information corresponding to said third user identifier from at least one of said first and second domains (e.g., the domain to which the third user identifier corresponds and from which the user identifier was retrieved); and the contact list distribution module 1706 is further configured to distribute, with the aggregated contact list, presence information corresponding to the second user. In some embodiments the presence information request module is included in a communications interface module, e.g., receiver/transmitter module 1718. In some embodiments the presence information request module is part of the I/O Interfaces 302. In various embodiments, the presence information corresponding to the second user is aggregated presence information that is generated by the PAIF device in accordance with the above described embodiments, e.g., the methods shown and discussed in connection with the flowchart of FIG. 2.

In some embodiments the system also includes a determination module 1712 configured to determine, based on said third user identifier, whether information stored in the memory 314, data/information 322 includes additional user identifiers corresponding to said second user, the additional user identifiers including a fourth user identifier.

In some embodiments the presence information request module 1708 is further configured to request presence information from a domain corresponding to the fourth user identifier corresponding to said second user, the fourth identifier corresponding to a different domain than the third user identifier, when said determination module 1712 determines that said stored information includes additional user identifiers corresponding to the second user:

In various embodiments, the system also includes an aggregated presence information generation module 1710 configured to aggregate presence information received in response to the requests for presence information corresponding to the third and fourth user identifiers to generate aggregated presence information for the second user. In some of such systems said presence information corresponding to said second user distributed with said aggregated contact list includes said aggregated presence information for said second user. In various embodiments, the contact list distribution module 1706 is configured to aggregate presence information which includes real time presence information.

Storage module 1714 is configured to storage presence information received and/or generated such as aggregated presence information in memory 314, data/information 322 for later use in processing.

In some embodiments of the system the contact list distribution module 1706 is configured to determine which contacts are reachable from the domain to which the aggregated contact list is being distributed and to omit from the aggregated contact list to be distributed to the first domain, contacts which are not reachable from said first domain.

The information processing module 1716 is also configured to process the contact information including the presence information to distributed by the contact list distribution module, e.g., to perform any format conversions necessary so that the format of the distributed contact list information is in a format compatible to one or more of the devices in the various domains to which it is distributed.

In some embodiments of the system the contact list distribution module 1706 is further configured to omit from the aggregated contact list distributed to the second domain, contacts which are not reachable from said second domain.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a data processing system. Various embodiments are also directed to methods, e.g., a method of processing data. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

In various embodiments, servers, e.g., application servers, may be utilized. Servers may be implemented in one or more circuits thus in some embodiments a server is a hardware device. In some embodiments servers may be software. In some embodiments servers may be a combination of hardware and software.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of operating a presence aggregation interworking apparatus, comprising:
storing in memory for a first user a first set of user identifiers identifying said first user, said first set of user identifiers including a first user identifier identifying said first user in a first domain and a second user identifier identifying said first user in a second domain;
requesting, using the first user identifier, contacts associated in the first domain with the first user identifier;
requesting, using the second user identifier, contacts associated in the second domain with the second user identifier;
generating an aggregated contact list for said first user from a first contact list received from said first domain and from a second contact list received from said second domain; and
wherein said aggregated contact list includes user identifiers identifying users other than the first user, said aggregated contact list including a third user identifier identifying a second user in a third domain and a fourth user identifier identifying said second user in a fourth domain, said second user being different from said first user, the method further comprising:
monitoring activity of the second user across the third and fourth domains by monitoring devices in the third and fourth domains using the third and fourth user identifiers, said monitoring activity of the second user across the third and fourth domains by monitoring devices in the third and fourth domains using the third and fourth user identifiers includes monitoring signals from said devices in the third and fourth domains using the third and fourth user identifiers; and
generating aggregated presence information for the second user based on the monitored user activity across the third and fourth domains.

2. The method of claim 1, further comprising:
distributing said generated aggregated presence information for the second user with said aggregated contact list to one or more devices in said first domain and to one or more devices in said second domain.

3. The method of claim 2,
wherein said presence aggregation interworking apparatus is a Session Border Controller;
wherein said one or more devices in said first domain include a first contact server; and
wherein distributing said generated aggregated presence information for the second user with said aggregated contact list includes transmitting an indicator that said aggregated contact list is an aggregation of contacts.

4. A method of operating a presence aggregation interworking apparatus, comprising:
storing in memory for a first user a first set of user identifiers identifying said first user, said first set of user identifiers including a first user identifier identifying said first user in a first domain and a second user identifier identifying said first user in a second domain;
requesting, using the first user identifier, contacts associated in the first domain with the first user identifier;
requesting, using the second user identifier, contacts associated in the second domain with the second user identifier;
generating an aggregated contact list for said first user from a first contact list received from said first domain and from a second contact list received from said second domain;
distributing said aggregated contact list to one or more devices in said first domain and to one or more devices in said second domain;
wherein said one or more devices in said first domain include a first server;
wherein distributing said aggregated contact list includes transmitting an indicator that said aggregated contact list is an aggregation of contacts;
wherein said aggregated contact list includes user identifiers identifying users other than the first user, said aggregated contact list including a third user identifier identifying a second user in a third domain and a fourth user identifier identifying said second user in a fourth domain, said second user being different from said first user, the method further comprising:

monitoring activity of the second user across the third and fourth domains by monitoring devices in the third and fourth domains using the third and fourth user identifiers; and generating aggregated presence information for the second user based on the monitored user activity across the third and fourth domains.

5. The method of claim 4 further comprising:

requesting presence information for said third user identifier from at least one of said first and second domains; and distributing, with said aggregated contact list, presence information for said second user.

6. The method of claim 5, further comprising:

determining, based on said third user identifier, whether information stored in said memory includes additional user identifiers which identify said second user, said additional user identifiers including a fifth user identifier.

7. The method of claim 6, further comprising, when it is determined that said stored information includes additional user identifiers identifying said second user:

requesting presence information for said second user using said fifth user identifier from a domain, said domain from which said presence information is requested for said second user using said fifth user identifier being a domain in which said fifth user identifier identifies said second user and being different from a domain in which said third user identifier identifies said second user.

8. The method of claim 7, further comprising:

aggregating presence information received in response to said requests for presence information for said third and fifth user identifiers with said generated aggregated presence information for the second user based on the monitored user activity across the third and fourth domains, said aggregating producing updated aggregated presence information for said second user.

9. The method of claim 8, wherein said presence information for said second user distributed with said aggregated contact list includes said generated aggregated presence information for said second user.

10. The method of claim 9, wherein said generated aggregated presence information includes real time presence information.

11. A system, comprising:

a presence aggregation interworking apparatus, said presence aggregation interworking apparatus including:
- a memory for storing a first set of user identifiers identifying a first user, said first set of user identifiers including a first user identifier identifying said first user in a first domain and a second user identifier identifying said first user in a second domain;
- a contact information request module configured to request, using the first user identifier, contacts associated in the first domain with the first user identifier;

said contact information request module further configured to request, using the second user identifier, contacts associated in the second domain with the second user identifier;

- a contact list aggregator module configured to generate an aggregated contact list for said first user from a first contact list received from said first domain and from a second contact list received from said second domain, said aggregated contact list including user identifiers identifying users other than the first user, said aggregated contact list including a third user identifier identifying a second user in a third domain and a fourth user identifier identifying said second user in a fourth domain, said second user being different from said first user; and
- a processor that controls the presence aggregation interworking apparatus to:
  (i) monitor activity of the second user across the third and fourth domains by monitoring devices in the third and fourth domains using the third and fourth user identifiers, and
  (ii) generate aggregated presence information for the second user based on the monitored user activity across the third and fourth domains.

12. The system of claim 11 wherein said presence aggregation interworking apparatus, further includes:

a contact list distribution module configured to distribute said aggregated contact list to one or more devices in said first domain and to one or more devices in said second domain.

13. The system of claim 12, wherein said one or more devices in said first domain include a first server; and wherein said contact list distribution module is further configured, as part of being configured to distribute said aggregated contact list to one or more devices in said first domain and to one or more devices in said second domain, to transmit an indicator that said aggregated contact list is an aggregation of contacts.

14. The system of claim 13 wherein said presence aggregation interworking apparatus, further comprises:

a presence information request module configured to request presence information for said third user identifier from at least one of said first and second domains; and wherein said contact list distribution module is further configured to distribute, with said aggregated contact list, presence information corresponding to said second user.

15. The system of claim 14 wherein said presence information request module is included in a communications interface module.

16. The system of claim 14, further comprising:

a determination module configured to determine, based on said third user identifier, whether information stored in said memory includes additional user identifiers which identify said second user, said additional user identifiers including a fifth user identifier.

17. The system of claim 16, wherein said presence information request module is further configured to request presence information for said second user using said fifth user identifier from a domain, said domain from which presence information is requested for said second user being a domain in which said fifth user identifier identifies said second user and being different from a domain in which said third user identifier identifies said second user, when said determination module determines that said stored information includes additional user identifiers identifying said second user.

18. The system of claim 17, further comprising:

an aggregated presence information generation module configured to aggregate presence information received in response to said requests for presence information for said third and fifth user identifiers with said generated aggregated presence information for the second user based on the monitored user activity across the third and fourth domains to generate updated aggregated presence information for said second user.

19. The system of claim 18, wherein said presence information for said second user distributed with said aggregated contact list includes said updated aggregated presence information for said second user.

* * * * *